United States Patent
Kikkawa et al.

(10) Patent No.: US 7,752,289 B2
(45) Date of Patent: Jul. 6, 2010

(54) DEVICE AUTHENTICATION APPARATUS DEVICE AUTHENTICATION METHOD INFORMATION PROCESSING APPARATUS INFORMATION PROCESSING METHOD AND COMPUTER PROGRAM

(75) Inventors: Norifumi Kikkawa, Tokyo (JP); Tatsuya Igarashi, Tokyo (JP); Yoichi Kobori, Kanagawa (JP); Takehiko Morita, Kanagawa (JP); Yoshiyuki Takaku, Tokyo (JP); Noriyuki Sakoh, Kanagawa (JP); Masaaki Hamada, Tokyo (JP)

(73) Assignee: Sony Corporation, Tokyo (JP)

( * ) Notice: Subject to any disclaimer, the term of this patent is extended or adjusted under 35 U.S.C. 154(b) by 1808 days.

(21) Appl. No.: 10/491,890

(22) PCT Filed: Aug. 29, 2003

(86) PCT No.: PCT/JP03/11034

§ 371 (c)(1),
(2), (4) Date: Apr. 15, 2004

(87) PCT Pub. No.: WO2004/023727

PCT Pub. Date: Mar. 18, 2004

(65) Prior Publication Data

US 2005/0021786 A1 Jan. 27, 2005

(30) Foreign Application Priority Data

Sep. 2, 2002 (JP) ........................... P 2002-256471
Feb. 28, 2003 (JP) ........................... P 2003-052375

(51) Int. Cl.
*G06F 15/177* (2006.01)
*G06F 15/16* (2006.01)
(52) U.S. Cl. ..................................... 709/222; 709/229

(58) Field of Classification Search ......... 709/202–211, 709/217–238, 245–249
See application file for complete search history.

(56) References Cited

U.S. PATENT DOCUMENTS

| 6,282,201 B1 * | 8/2001 | Alexander et al. ........... 370/401 |
| 6,594,227 B1 * | 7/2003 | Ogawa et al. ................ 370/216 |
| 6,609,152 B1 * | 8/2003 | Ono ............................ 709/222 |
| 7,359,989 B2 * | 4/2008 | Orava et al. ................. 709/245 |
| 2001/0017856 A1 * | 8/2001 | Asokan et al. ............... 370/389 |

(Continued)

FOREIGN PATENT DOCUMENTS

JP 7-121449 5/1995

(Continued)

*Primary Examiner*—Asad M Nawaz
(74) *Attorney, Agent, or Firm*—Oblon, Spivak, McClelland, Maier & Neustadt, L.L.P.

(57) ABSTRACT

An apparatus and a method capable of efficiently and accurately constructing an access control configuration having high security are realized. Only the MAC address of a controller (client) 351 authorized by a user is authenticated and registered in a MAC address table of a device 352, and the device 352 performs MAC address filtering for permitting access by the controller 351 (client) which is authenticated and registered in the MAC address table. Furthermore, by making a registration completion notification and by performing version adjustment, a reliable access control configuration is constructed. The device authentication apparatus 350 avoids access from an unauthorized party which is not authenticated and registered, and makes the presence of a server not known to the controller which attempts to illegally perform device authentication. Therefore, access control with high security is realized.

6 Claims, 14 Drawing Sheets

U.S. PATENT DOCUMENTS

| | | |
|---|---|---|
| 2002/0026523 A1* | 2/2002 | Mallory et al. ............... 709/236 |
| 2003/0076837 A1* | 4/2003 | Whitehill et al. ......... 370/395.4 |
| 2003/0179707 A1* | 9/2003 | Bare ......................... 370/235 |
| 2004/0001433 A1* | 1/2004 | Gram et al. ................. 370/229 |
| 2004/0205234 A1* | 10/2004 | Barrack et al. .............. 709/238 |
| 2005/0135407 A1* | 6/2005 | Mora ......................... 370/445 |
| 2005/0157732 A1* | 7/2005 | Joy et al. .................... 370/401 |
| 2009/0031044 A1* | 1/2009 | Barrack et al. .............. 709/247 |
| 2009/0171982 A1* | 7/2009 | Hagan et al. .................. 707/10 |

FOREIGN PATENT DOCUMENTS

| | | |
|---|---|---|
| JP | 3067019 | 12/1999 |
| JP | 2000-59393 | 2/2000 |
| JP | 2001-310283 | 11/2001 |
| JP | 2002-204247 | 7/2002 |

* cited by examiner

DEVICE AUTHENTICATION APPARATUS DEVICE AUTHENTICATION METHOD INFORMATION PROCESSING APPARATUS INFORMATION PROCESSING METHOD AND COMPUTER PROGRAM

TECHNICAL FIELD

The present invention relates to a device authentication apparatus and a device authentication method, which are efficiently and reliably generating access right determination information in a configuration in which communication among devices which are connected over a network is performed, so that an access limitation process based on the generated information can be performed, to an information processing apparatus therefor, an information processing method therefor, and a computer program therefor. More particularly, the present invention relates to technology for a configuration suitable for use in a home network in which network-compatible household electrical appliances, computers, and peripheral devices thereof are connected via a network; in a public wireless LAN environment, etc.

BACKGROUND ART

Along with the widespread use of data communication networks in recent years, a so-called home network in which household electrical appliances, computers, and other peripheral devices are connected via a network, so that communication is made possible among the devices, has been spreading even within households. The home network provides convenience and comfort to users, for example, sharing the data processing function of each device and performing transmission and reception of content among devices by performing communication among network-connected devices, and it is predicted that, in the future, the home network will become increasingly common.

As a protocol suitable for the configuration of such a home network, a universal plug-and-play (UPnP: Universal Plug and Play) is known. The universal plug-and-play (UPnP) makes it possible to easily construct a network without involving complex operation, and makes it possible to receive services provided by each connected device in the network-connected device without involving complex operation and settings. Furthermore, UPnP does not depend on the OS (operating system) of the device, and has the advantage in that devices can be easily added.

UPnP exchanges a definition file in compliance with XML (eXtensible Markup Language) among connected devices and performs mutual recognition among devices. The overview of UPnP is as described below.

(1) An addressing process for obtaining its own device ID, such as the IP address.
(2) A discovery process for searching each device on the network, receiving a response from each device, and obtaining information, such as the device type, functions, etc., contained in the response.
(3) A service requesting process for requesting services to each device on the basis of the information obtained in the discovery process.

As a result of performing the above-mentioned processing procedure, reproduction and reception of services using a network-connected device becomes possible. The device which is newly connected to the network acquires the device ID by the above-mentioned addressing process, acquires the information of the other network-connected devices by another discovery process, and thus making a request for services to the other devices becomes possible based on the obtained information.

On the other hand, however, in this type of network, countermeasures against unauthorized access need to be considered. In the device, for example, the server, within the home network, private content, and content requiring copyright management such as chargeable content, are often stored.

Content stored in the server within such a home network becomes accessible from another network-connected device. For example, it becomes possible for the device in which the above-described UPnP connection, which is a simple device connection configuration, is performed, to obtain content. In a case where content is movie data or music data, if a TV or a player is connected as a network-connected device, it becomes possible to view a movie or listen to music.

Access by a device connected by a user having a content usage right is permitted. However, in the network configuration such as that described above, it is easy for a user not having a right for using content, etc., to invade the network. For example, in the case of a network configured by a wireless LAN, a situation can also occur in which, with respect to the server within one's home, someone illegally enters the network by using a communication device from outdoors or from the house next door, and content is exploited. A configuration in which such unauthorized access is permitted causes secrecy to leak, and also, becomes a serious issue from the viewpoint of managing content copyright.

In order to eliminate unauthorized access such as that described above, for example, a configuration has been proposed in which the server is made to store a list of clients for whom access is permitted, so that, when a request for accessing the server from the client is made, a process for verifying against the list at the server is performed to eliminate unauthorized access.

For example, MAC address filtering in which a MAC (Media Access Control) address, which is a physical address specific to a network-connected device, is set as an access permission device list is known. The "MAC address filtering" is such that MAC addresses for permitting access are registered in advance in a router or a gateway which separates the internal network (subnet) such as the home network from an external network, so that the MAC address of the received packets is verified against the registered MAC address, and access from a device having a MAC address which is not registered is rejected. This type of technology is disclosed in, for example, Japanese Unexamined Patent Application Publication No. 10-271154.

However, in order to perform a MAC address registration process for the purpose of limiting access, it is necessary to examine all the MAC addresses of the devices which are connected in the network. Therefore, a process such that an operator inputs all the obtained MAC addresses (48 bits) of the devices in order to create a list becomes necessary. When a secure environment, for example, a specific company, organization, etc., is requested to be constructed, such a process can also be performed under a predetermined manager. However, for example, in a home network environment set up in an ordinary household, requesting an ordinary user to create and store a MAC list is not practical.

In the home network, a situation in which a process for newly adding devices is performed occurs frequently. During such a device addition process, if the user needs to check the MAC addresses of the devices one by one and to perform a registration process, the ease of the network construction is hindered.

On the other hand, also, in an ordinary household, as a result of a network configuration including not only PCs, but also household electrical devices being constructed, a commonly called ubiquitous environment in which access to a network is possible from any device is being constructed. Furthermore, with widespread use of a wireless LAN, etc., it has become easy for a communicable device to externally invade a wireless LAN. In such a network environment, unauthorized access to a network-connected device has become liable to occur, and the possibility that secret information is exploited by unauthorized access and content is illegally read has become increasingly high. In such circumstances, there has been a demand for easily realizing an appropriate access control configuration without imposing burden on an ordinary user.

DISCLOSURE OF THE INVENTION

The present invention has been made in view of the above-described problems. An object of the present invention is to provide a device authentication apparatus and a device authentication method, which are capable of easily and appropriately constructing an access control configuration without imposing burden on an ordinary user having a network-connected device, and an information processing apparatus therefor, an information processing method therefor, and a computer program therefor, in a configuration in which various devices are connected via a network.

In a commercial network provided by a certain type of ISP (Internet service provider), a plurality of users are assigned to the same subnet. In a case where such connection services are to be received, there is a problem in that, in order that the home network of one's home is not illegally accessed from another user within the same subnet, a router for performing the above-described MAC address filtering must be provided. Furthermore, in connection services using a cable TV, there are cases in which a router connection is prohibited in the contract. In such connection services, MAC address filtering cannot be performed, and access authentication is performed using the IP address. However, since the IP address is set logically, false personation can be made comparatively easily, and there is a drawback in that access control with high security is difficult.

Accordingly, the present invention has been made in view of such circumstances. Another object of the present invention is to provide a device authentication apparatus, a device authentication method, and a device authentication program, which are capable of performing access control with high security without using a router.

In addition, the present invention realizes a configuration for ensuring that a proper registration process for client devices is reliably performed, specifically, a registration completion notification process, in an authentication process for constructing an access control configuration, that is, a device registration process. Another object of the present invention is to provide a device authentication apparatus and a device authentication method which solve problems in a case where a registration process message, the registration process being performed between the server and the client, is different depending on the version of a device registration process execution program and which reliably realize a device registration process also in a network environment in which various new and old devices coexist, in a device registration process, an information processing apparatus therefor, an information processing method therefor, and a computer program therefore.

In a first aspect,
the present invention provides a device authentication apparatus including: a first device provided on the client side of a client/server system; and a second device provided on the server side of the client/server system, wherein the first device includes registration requesting means for simultaneously sending a request for registering a MAC address specific to the first device in response to a registration requesting operation of a user; the second device includes temporary storage means for, when a registration request having the same MAC address is received a plurality of times or for one time within a predetermined time after a first confirmation operation of the user is performed, temporarily storing the MAC address; the second device includes registration confirmation means for sending a registration confirmation to the first device having the MAC address stored in the temporary storage means in response to a second confirmation operation of the user; the first device includes registration confirmation responding means for receiving the registration confirmation so as to instruct the registration requesting means to stop the simultaneous sending, and also for sending back a registration confirmation response to the second device which has sent the registration confirmation; the second device includes authentication and registration means for authenticating and registering the MAC address which is temporarily stored in the temporary storage means in response to a third confirmation operation of the user, which is performed after the registration confirmation response is received, and the second device rejects access from a client including the first device having a MAC address other than the MAC address which is authenticated and registered in the second device itself, and instructs the server not to respond at all to the client.

In one form of the device authentication apparatus of the present invention, preferably, when the second device receives a plurality of conflicting registration requests having different MAC addresses, the second device does not temporarily store those conflicting MAC addresses and stops the device authentication by ignoring the registration request from the first device having a conflicting MAC address.

In a second aspect,
the present invention provides a device authentication apparatus including: a first device provided on the client side of a client/server system; and a second device provided on the server side of the client/server system, wherein the first device includes registration requesting means for simultaneously sending a request for registering a MAC address specific to the first device in response to the registration requesting operation of a user; the second device includes temporary storage means for, when a registration request having the same MAC address is received a plurality of times within a predetermined time after a first confirmation operation of a user is performed, temporarily storing the MAC address; the second device includes registration confirmation means for sending a registration confirmation and a password request to the first device having the MAC address stored in the temporary storage means in response to a second confirmation operation of the user; means for displaying the password generated for the user; and means for storing the generated password in the second device itself; the first device include registration confirmation responding means for receiving the registration confirmation so as to instruct the registration requesting means to stop the simultaneous sending, and also for sending back the password input by the user operation and a registration confirmation response to the second device which has sent the registration confirmation; the second device includes authentication and registration means for authenticating and registering the MAC address which is temporarily stored in the temporary storage means when the password received from the registration confirmation responding means is verified against the password stored in the second device itself and the two passwords match each other, and the second device rejects access from a client including the first device having a MAC address other than the MAC address which is authenticated and registered in the second device itself, and instructs the server not to respond at all to the client.

In one form of the device authentication apparatus of the present invention, preferably, the second device stops the device authentication by deleting the MAC address which is temporarily stored in the temporary storage means when the verification between the password received from the first device side and the password which is set in advance in the second device itself does not continuously match a predetermined number of times.

In a third aspect, the present invention provides a device authentication method including: wherein the first process includes a registration requesting step of simultaneously sending, on a network, a request for registering a MAC address specific to the client in response to a registration requesting operation of a user; the second process includes a temporary storing step of, when a registration request having the same MAC address is received a plurality of times within a predetermined time after a first confirmation operation of the user is performed, temporarily storing the MAC address; the second process includes a registration confirmation step of sending to the client side a registration confirmation performed at the client having the MAC address stored in the temporary storing step in response to a second confirmation operation of the user; the first process includes a registration confirmation responding step of receiving the registration confirmation so as to instruct the registration requesting step to stop the simultaneous sending, and also for sending back a registration confirmation response to the server which has sent the registration confirmation; the second process includes an authentication and registration step of authenticating and registering the MAC address which is temporarily stored in the temporary storing step in response to a third confirmation operation of the user, which is performed after the registration confirmation response is received, and the second process rejects access from a client having a MAC address other than the MAC address which is authenticated and registered in the server itself, and instructs the server not to respond at all to the client.

In one form of the device authentication method of the present invention, preferably, when a plurality of conflicting registration requests having a different MAC address are received, the second process does not temporarily store those conflicting MAC addresses, and stops device authentication by ignoring the registration request from the first process performed on the client side having a conflicting MAC address.

In a fourth aspect, the present invention provides a device authentication method including: a first process performed on the client side of a client/server system; and a second process performed on the server side of the client/server system, wherein the first process includes a registration requesting step of simultaneously sending, on a network, a request for registering a MAC address specific to the client in response to the registration requesting operation of a user; the second process includes a temporary storing step of, when a registration request having the same MAC address is received a plurality of times within a predetermined time after a first confirmation operation of a user is performed, temporarily storing the MAC address; the second process includes a registration confirmation step of sending a registration confirmation and a password request to the first process performed at the client having the MAC address which is temporarily stored in the temporary storing step in response to a second confirmation operation of the user; the first process include a registration confirmation responding step of receiving the registration confirmation so as to instruct the registration requesting step to stop the simultaneous sending, and also for sending back the password input by the user operation and a registration confirmation response to the second process which has sent the registration confirmation; the second process includes an authentication and registration step of authenticating and registering the MAC address which is temporarily stored in the temporary storing step when the password received in the registration confirmation responding step is verified against the password set in advance in the server itself and the two passwords match each other, and the second process rejects access from a client having a MAC address other than the MAC address which is authenticated and registered in the server itself, and instructs the server not to respond at all to the client.

In one form of the device authentication method of the present invention, preferably, the second process stops the device authentication by deleting the MAC address which is temporarily stored in the temporary storing step when the verification between the password received from the first process side and the password which is set in advance in the server itself does not continuously match a predetermined number of times.

In a fifth aspect, the present invention provides a device authentication program including: a first program executed on the client side of a client/server system; and a second program executed on the server side of the client/server system, wherein the first program includes a registration requesting step of simultaneously sending, on a network, a request for registering a MAC address specific to the client in response to a registration requesting operation of a user; the second program includes a temporary storing step of, when a registration request having the same MAC address is received a plurality of times within a predetermined time after a first confirmation operation of the user is performed, temporarily storing the MAC address; the second program includes a registration confirmation step of sending a registration confirmation to the first program executed at the client having the MAC address stored in the temporary storing step in response to a second confirmation operation of the user; the first program includes a registration confirmation responding step of receiving the registration confirmation so as to instruct the registration requesting step to stop the simultaneous sending, and also for sending back a registration confirmation response to the second program which has sent the registration confirmation; the second program includes an authentication and registration step of authenticating and registering the MAC address which is temporarily stored in the temporary storing step in response to a third confirmation operation of the user, which is performed after the registration confirmation response is received, and the second program rejects access from a client having a MAC address other than the MAC address which is authenticated and registered in the server itself, and instructs the server not to respond at all to the client.

In one form of the device authentication method of the present invention, preferably, when a plurality of conflicting registration requests having a different MAC address are received, the second program does not temporarily store those conflicting MAC addresses, and stops the device authentication by ignoring the registration request from the first program executed on the client side having the conflicting MAC address.

In a sixth aspect, the present invention provides a device authentication program including: a first program executed on the client side of a client/server system; and a second program executed on the server side of the client/server system, wherein the first program includes a registration requesting step of simultaneously sending, on a network, a request for registering a MAC address specific to the client in response to the registration requesting operation of a user; the second process includes a temporary storing step of, when a registration request having the same MAC address is received a plurality of times within a predetermined time after a first confirmation operation of the user is performed, temporarily storing the MAC address; the second program includes a registration confirmation step of sending a registration confirmation and a password request to the first program executed at the client having the MAC address which is temporarily stored in the temporary storing step in response to a second confirmation operation of the user; the first program include a registration confirmation responding step of receiving the registration confirmation so as to instruct the registration requesting step to stop the simultaneous sending, and also of sending back the password input by the user operation and a registration confirmation response to the second program which has sent the registration confirmation; the second program includes an authentication and registration step of authenticating and registering the MAC address which is temporarily stored in the temporary storing step when the password received from the registration confirmation responding step is verified against the password set in advance in the server itself and the two passwords match each other, and the second program rejects access from a client having a MAC address other than the MAC address which is authenticated and registered in the server itself, and instructs the server not to respond at all to the client.

In one form of the device authentication program of the present invention, preferably, the second program stops the device authentication by deleting the MAC address which is temporarily stored in the temporary storing step when the verification between the password received from the first program side and the password which is set in advance in the second program itself does not continuously match a predetermined number of times.

In a seventh aspect, the present invention provides an information processing apparatus for performing an access control process including:

a data transmission and reception section for performing data transmission and reception with a client as an access requesting device;

a storage section for storing access control information containing a client MAC address;

a registration processing section for performing a client MAC address registration process based on a registration request from client;

a data output section for performing data output based on a device signal from the registration processing section; and a data input section for inputting data to the registration processing section, wherein the registration processing section outputs registration confirmation data to be transmitted to the client on the basis of the determination that the registration is possible in accordance with the registration request from the client, and performs a process for outputting registration confirmation data to be transmitted to the client on the basis of the reception of a registration confirmation response from the client with respect to the registration completion confirmation data.

In one form of the information processing apparatus of the present invention, preferably, the registration processing section outputs, as a device signal, a received status of the registration confirmation response from the client, the data output section outputs registration confirmation response received status information based on the device signal output, and the registration processing section performs a process for outputting the registration completion confirmation data on the basis of user input via the data input section after the registration confirmation response received status information is output.

In one form of the information processing apparatus of the present invention, preferably, the registration processing section outputs registration completion information as a device signal on the basis of the reception of the registration completion confirmation response from the client with respect to the registration completion confirmation, and the data output section outputs a registration completion message based on the device signal output.

In one form of the information processing apparatus of the present invention, preferably, the registration processing section performs a process for setting a password request flag in the registration confirmation data as transmission data for the client, generating a password, and outputting the password to the data output section, and also performs a process for verifying a password received from the client against the generated password and for outputting the registration completion confirmation data under the condition that the verification matches.

In an eighth aspect, the present invention provides an information processing apparatus for performing an access control process, the information processing apparatus including:

a data transmission and reception section for performing data transmission and reception with a client as an access requesting device;

a storage section for storing access control information containing a client MAC address; and a registration processing section for performing a client MAC address registration process based on a registration request from the client, wherein the registration processing section compares the version information of a device authentication program, contained in the registration request from the client, with the version information of a device authentication program executed in its own device, and selects and performs a process in accordance with the processing sequence of the program of the older version between the two programs on the basis of the comparison result.

In one form of the information processing apparatus of the present invention, preferably, the version information is composed of a major version and a minor version, the registration processing section stops a process when the major version of the device authentication program, contained in the registration request from the client, differs from the major version of the device authentication program executed in its own device, and when the major versions of the two programs match each other, the registration processing section compares the minor versions of the two programs, and selects and performs a process in accordance with the processing sequence corresponding to the minor version indicating the older version.

In a ninth aspect, the present invention provides an information processing apparatus for performing an access control process, the information processing apparatus including:

a data transmission and reception section for performing data transmission and reception with a client as an access requesting device;

a storage section for storing access control information containing a client MAC address; and a registration processing section for performing a client MAC address registration process based on a registration request from the client, wherein the registration processing section determines whether or not the client MAC address contained in the registration request from the client is registered in access control information stored in the storage section, and performs a process for outputting, as transmission data for the client, a registration completion notification indicating that the registration has been completed on the basis of the determination that the registration has been completed.

In one form of the information processing apparatus of the present invention, preferably, the information processing apparatus has a data output section for performing data output based on a device signal from the registration processing section, the registration processing section outputs, as a device signal, response reception information from the client with respect to the registration completion notification, and the data output section performs message output based on the device signal.

In a tenth aspect, the present invention provides an information processing apparatus as a client for performing an access right registration process on a server, the information processing apparatus including:

a data transmission and reception section for performing data transmission and reception with the server;

a storage section for storing a client MAC address;

a registration request processing section for performing a client MAC address registration requesting process;

a data output section for performing data output based on a device signal from the registration request processing section; and a data input section for inputting data to the registration request processing section, and the registration request processing section performs a process for outputting, as a response for the registration confirmation, a registration confirmation response to be transmitted to the server on the basis of the registration confirmation received from the server registration request and for outputting, as a response for the registration completion confirmation from the server, a registration completion confirmation to be transmitted to the server.

In one form of the information processing apparatus of the present invention, preferably, the registration request processing section outputs, as a device signal, a received status of the registration completion confirmation from the server, and the data output section outputs a registration completion message based on the device signal output.

In one form of the information processing apparatus of the present invention, preferably, the registration request processing section performs a process for outputting a service search processing request to be transmitted to the server under the condition that the registration completion confirmation is received.

In an eleventh aspect, the present invention provides an information processing apparatus as a client for performing an access right registration process on a server, the information processing apparatus including: a data transmission and reception section for performing data transmission and reception with the server;

a storage section for storing a client MAC address; and a registration request processing section for performing a client MAC address registration requesting process, wherein the registration request processing section performs a comparison between the version information of a device authentication program, contained in the registration confirmation from the server, and the version information of a device authentication program to be executed in its own device, and selects and performs a process in accordance with the processing sequence of the program of the older version of the two programs on the basis of the comparison result.

In one form of the information processing apparatus of the present invention, preferably, the version information is information composed of a major version and a minor version, and the registration request processing section stops a process when the major version of the device authentication program, contained in the registration confirmation from the server, differs from the major version of the device authentication program executed in its own device, performs a comparison between the minor versions of the two programs when the major versions of the two programs match each other, and selects and performs a process in accordance with the processing sequence of the program corresponding to the minor version indicating the older version.

In a twelfth aspect, the present invention provides an information processing apparatus as a client that performs an access right registration process on the server, the information processing apparatus including: a data transmission and reception section for performing data transmission and reception with the server;

a storage section for storing a client MAC address;

a registration request processing section for performing a client MAC address registration requesting process; and a data output section for performing data output on the basis of a device signal from the registration request processing section, wherein the registration request processing section determines whether or not registration completion notification data indicating that the registration has been completed is contained in the registration confirmation received from the server, and outputs, as a device signal, determination information such that the registration completion notification data is contained, and the data output section performs message output based on the device signal.

In a thirteenth aspect, the present invention provides an information processing method for performing a device registration process for the purpose of access control, the information processing method including:

a data reception step of receiving a registration request from a client as an access requesting device; and a registration processing step of performing a client MAC address registration process based on the registration request, wherein the registration processing step includes a step of performing a process for outputting registration confirmation data to be transmitted to the client on the basis of the determination that the registration is possible in accordance with the registration request from the client and of outputting registration completion confirmation data to be transmitted to the client on the basis of the reception of the registration confirmation response from the client with respect to the registration confirmation data.

In one form of the information processing method of the present invention, the information processing method may include a step of outputting, as a device signal, a received status of the registration confirmation response from the client and of outputting registration confirmation response received status information based on the device signal, wherein a process for outputting the registration completion confirmation data is performed on the basis of user input after the registration confirmation response received status information is output.

In one form of the information processing method of the present invention, the information processing method may include a step of outputting, as a device signal, registration completion information on the basis of the reception of the registration completion confirmation response from the client with respect to the registration completion confirmation and of outputting a registration completion message based on the device signal output.

In one form of the information processing method of the present invention, the information processing method may include: a step of setting a password request flag in the registration confirmation data as transmission data for the client; a step of generating a password and outputting the generated password to the data output section; and a step of verifying the password received from the client against the generated password and performing a process for outputting the registration completion confirmation data under the condition that the verification matches.

In a fourteenth aspect, the present invention provides an information processing method for performing a device registration process for the purpose of access control, the information processing method including:

a data reception step of receiving a registration request from a client as an access requesting device; and a registration processing step of performing a client MAC address registration process on the basis of the registration request, wherein the registration processing step includes a step of comparing the version information of a device authentication program, contained in the registration request from the client, with the version information of a device authentication program executed in its own device, and of selecting and performing a process in accordance with the processing sequence of the program of the older version between the two programs on the basis of the comparison result.

In one form of the information processing method of the present invention, preferably, the version information is information composed of a major version and a minor version, the registration processing step stops a process when the major version of the device authentication program, contained in the registration request from the client, differs from the major version of the device authentication program executed in its own device, and when the major versions of the two programs match each other, the registration processing step compares the minor versions of the two programs, and selects and performs a process in accordance with the processing sequence corresponding to the minor version indicating the older version.

In a fifteenth aspect, the present invention provides an information processing method for performing a device registration process for the purpose of access control, the information processing method including:

a data reception step of receiving a registration request from a client as an access requesting device;

a step of determining whether or not the client MAC address contained in the registration request from the client is registered in the access control information stored in a storage section; and a step of outputting, as transmission data for the client, a registration completion notification indicating that the registration has been completed on the basis of the determination that the registration has been completed.

In one form of the information processing method of the present invention, the information processing method may include: a step of outputting, as a device signal, response reception information from the client with respect to the registration completion notification and performing message output based on the device signal.

In a sixteenth aspect, the present invention provides an information processing method at a client that performs an access right registration process for a server, the information processing method including:

a step of transmitting a registration request to the server;

a step of outputting, as a response for the registration request, a registration confirmation response to be transmitted to the server on the basis of the registration confirmation received from the server; and a step of outputting, as a response for the registration completion confirmation from the server, a registration completion confirmation response to be transmitted to the server.

In one form of the information processing method of the present invention, the information processing method may include: a step of outputting, as a device signal, the received status of the registration completion confirmation from the server and outputting a registration completion message based on the device signal output.

In one form of the information processing method of the present invention, the information processing method may include a step of performing a process for outputting a service search processing request to be transmitted to the server under the condition that the registration completion confirmation is received from the server.

In a seventeenth aspect, the present invention provides an information processing method at a client that performs an access right registration process with respect to a server, the information processing method including:

a step of transmitting a registration request to the server;

a comparison processing step of performing a comparison between the version information of the device authentication program, contained in the registration confirmation received, as a response for the registration request, from the server and the version information of the device authentication program executed in its own device; and a step of selecting and performing a process in accordance with the processing sequence of the program of the older version between the two programs on the basis of the comparison processing result.

In one form of the information processing method of the present invention, preferably, the version information is information composed of a major version and a minor version, and in the information processing method, a process is stopped when the major version of the device authentication program, contained in the registration request from the server, differs from the major version of the device authentication program executed in its own device, and when the major versions of the two programs match each other, the minor versions of the two programs are compared with each other, and a process in accordance with the processing sequence corresponding to the minor version indicating the older version is selected and performed.

In an eighteenth aspect, the present invention provides an information processing method at a client that performs an access right registration process with respect to a server, the information processing method including:

a step of transmitting a registration request to the server;

a step of determining whether or not registration completion notification data indicating that the registration has been completed is contained in the registration confirmation received from the server as a response for the registration request; and a step of performing message output in accordance with the device signal based on the determination that the registration completion notification is contained.

In a nineteenth aspect, the present invention provides a computer program for performing a device registration process for the purpose of access control, the computer program including:

a data reception step of receiving a registration request from a client as an access requesting device; and a registration processing step of performing a client MAC address registration process based on the registration request, wherein the registration processing step includes a step of performing a process for outputting registration confirmation data to be transmitted to the client on the basis of the determination that the registration is possible in accordance with the registration request from the client and for outputting registration completion confirmation data to be transmitted to the client on the basis of the reception of the registration confirmation response from the client with respect to the registration confirmation data.

In a twentieth aspect, the present invention provides a computer program for performing a device registration process for the purpose of access control, the computer program including:

a data reception step of receiving a registration request from a client as an access requesting device; and a registration processing step of performing a client MAC address registration process on the basis of the registration request, wherein the registration processing step includes a step of comparing the version information of a device authentication program, contained in the registration request from the client, with the version information of a device authentication program executed in its own device, and selecting and performing a process in accordance with the processing sequence of the program of the older version between the two programs on the basis of the comparison result.

In a twenty-first aspect, the present invention provides a computer program for performing a device registration process for the purpose of access control, the computer program including:

a data reception step of receiving a registration request from a client as an access requesting device;

a step of determining whether or not the client MAC address contained in the registration request from the client is registered in the access control information stored in a storage section; and a step of outputting, as transmission data for the client, a registration completion notification indicating that the registration has been completed on the basis of the determination that the registration has been completed.

In a twenty-second aspect, the present invention provides a computer program for performing an access right registration process with respect to a server, the computer program including:

a step of transmitting a registration request to the server;

a step of outputting, as a response for the registration request, a registration confirmation response to be transmitted to the server on the basis of the registration confirmation received from the server; and a step of outputting, as a response for the registration completion confirmation from the server, a registration completion confirmation response to be transmitted to the server.

In a twenty-third aspect, the present invention provides a computer program for performing an access right registration process with respect to a server, the computer program including:

a step of transmitting a registration request to the server;

a comparison processing step of performing a comparison between the version information of the device authentication program, which is contained in the registration confirmation received from the server as a response for the registration request, and the version information of the device authentication program executed in its own device; and a step of selecting and performing a process in accordance with the processing sequence of the program of the older version between the two programs on the basis of the comparison processing result.

In a twenty-fourth aspect, the present invention provides a computer program for performing an access right registration process with respect to a server, the computer program including:

a step of transmitting a registration request to the server;

a step of determining whether or not registration completion notification data indicating that the registration has been completed is contained in the registration confirmation received from the server as a response for the registration request; and a step of outputting, as a device signal, information based on the determination that the registration completion notification is contained, and performing message output in accordance with the device signal.

According to the configuration of the present invention, only the MAC address of the first device (client) authorized by user operation is authenticated and registered by the second device, and the second device permits only the access to the first device (client) having the authenticated and registered MAC address. As a result, even if a router for separating from the other users within the same subnet is not disposed, while access from an unauthorized party which is not authenticated and registered is avoided, the presence of the server is not known to the first device (client) which attempts to illegally perform device authentication. Therefore, it becomes possible to provide access control with high security.

Furthermore, according to the configuration of the present invention, in a final step of a MAC registration process, a registration completion (Complete) confirmation process is performed, and a MAC registration completion confirmation is transmitted from the server (device) side to the client (controller) side. Therefore, at the two devices, it becomes possible for the user to confirm the final registration completion on the basis of the registration completion message. On the client (controller) side, if an M-search transmission process of SSDP (simple service detection protocol) as a service searching process is performed under the condition that a MAC registration completion confirmation notification is received from the server (device) side, since it is guaranteed that the MAC registration has been completed at the server (device) side, it is possible to reliably receive the response for the service searching process.

Furthermore, according to the configuration of the present invention, as a result of performing a registration completion (Complete) confirmation process, an M-search transmission process can be automatically performed under the condition that the MAC registration completion confirmation notification is received from the server (device) side, and it becomes possible for the client to receive service information from the server following the registration process with respect to the server without the intervention of a user's input process, etc.

Furthermore, according to the configuration of the present invention, when a MAC registration request from the client which has already been registered in the MAC list of the server is made, since a confirmation notification process for informing that the client has already been registered is performed among the devices, a message display for informing that the registration has been completed becomes possible on the basis of these notifications, and thus the user can confirm the fact that the client device has already been registered in the server.

Furthermore, according to the configuration of the present invention, in the device registration process between the server and the client, the version information of the processing programs possessed by the two devices is notified, and by adjusting the processing sequence, the device registration process is performed. Therefore, a device registration process in accordance with a unified processing sequence can be performed even among devices in which programs of various versions are stored.

The computer program of the present invention is a computer program which can be provided to, for example, a general-purpose computer system capable of executing various program codes, such computer program being provided by means of a storage medium and a communication medium, which are provided in a computer-readable format, for example, a storage medium such as a CD, an FD, and an MO, and a communication medium such as a network. As a result of providing such a program in a computer-readable form, a process corresponding to the program is realized on the computer system.

Further objects, features and advantages of the present invention will become apparent from the embodiments (to be described later) of the present invention with reference to the attached drawings. In this specification, the system designates a logical assembly of a plurality of devices, and it is not essential that the devices be disposed in the same housing.

BEST MODE FOR CARRYING OUT THE INVENTION

A description will now be given, with reference to the drawings, of the details of a device authentication apparatus, a device authentication method, an information processing apparatus, an information processing method, and a computer program of the present invention.

[System Overview]

Figure 1:
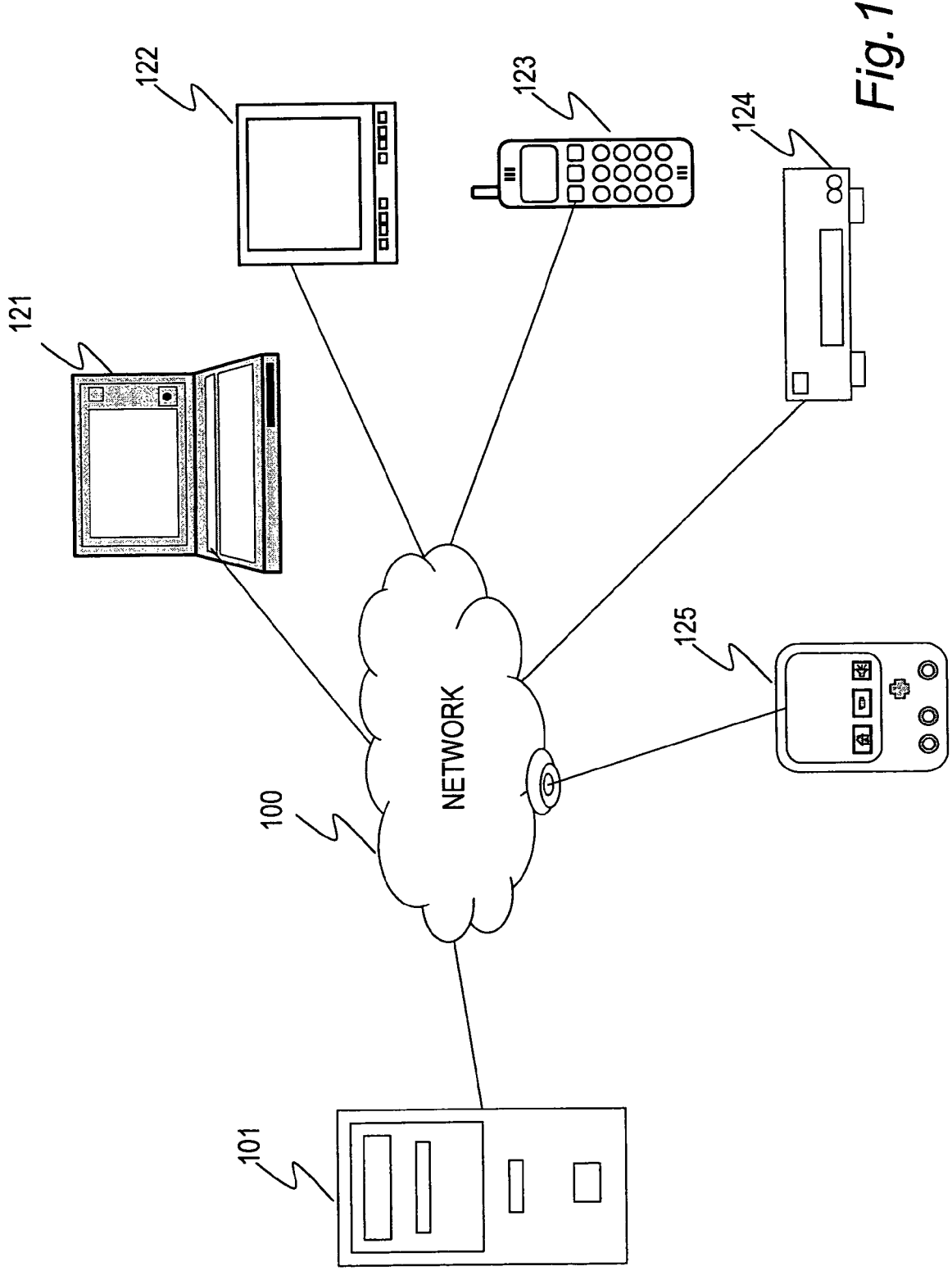
FIG. 1 shows an example of the configuration of a network to which the present invention can be applied.

First, referring to FIG. 1, a description will be given of an example of the configuration of a network to which the present invention can be applied. FIG. 1 shows a configuration, for example, a home network configuration, in which a server 101 that performs a process in accordance with a processing request from various client devices, a PC 121, a monitor 122, a cellular phone 123, a player 124, and a PDA (Personal Digital Assistant) 125, as client devices that makes a processing request to the server 101, are connected to one another via a network 100. In addition to the above, for the client device, various electronic devices and household electrical appliances can be connected.

Examples of processes, which are performed by the server 101 in response to a request from the client, include provision of content stored in storage means, such as a hard disk possessed by the server 101, and data processing services provided by the execution of an application program, which can be executed by the server. In FIG. 1, the server 101 and the client devices are shown in such a manner as to be distinguished, but a device which provides services for a request from the client is shown as a server, and any kind of client device becomes possible to provide functions as a server when self data processing services are provided to another client. Therefore, a network-connected client device shown in FIG. 1 can function as a server.

The network 100 is wired, wireless, or the like, and each connected device transmits and receives communication packets, such as, for example, Ethernet (registered trademark) frames, via the network 100. That is, the client performs a data processing request for the server 101 by transmitting to the server 101 a frame such that processing request information is stored in the data part of the Ethernet frame. The server 101 performs data processing in response to the reception of the processing request frame, stores the result data as the data processing result in the data part of the communication packet as necessary, and transmits it to each client.

The network-connected device is formed of, for example, a universal plug-and-play (UPnP: Universal Plug and Play)—compatible device. Therefore, this is a configuration in which addition and deletion of connected devices with respect to the network is easy. A device to be newly connected to the network becomes possible to receive services in which a network-connected device is used by performing the processing procedure described below:

(1) An addressing process for obtaining a self device ID, such as the IP address.

(2) A discovery process for searching each device on the network, receiving a response from each device, and obtaining information, such as the device type and function, contained in the response.

(3) A service requesting process for requesting services to each device on the basis of the information obtained in the discovery process.

A description will now be given, with reference to FIG. 2, an example of the configuration of PC hardware as an example of an information processing apparatus which forms the server and the client device shown in FIG. 1.

A CPU (Central Processing Unit) 201 performs various processes in accordance with a program stored in the ROM (Read Only Memory) 202, an HDD (hard disk drive) 204, etc., so as to function as a data processing means or a communication control processing means. In the RAM (random access memory) 203, programs to be executed by the CPU 201 and data are stored as appropriate. The CPU 201, the ROM 202, the RAM 203, and the HDD 204 are interconnected with one another via a bus 205.

An input/output interface 206 is connected to the bus 205, and, for example, an input section 207, including a keyboard, switches, buttons, and a mouse, which is operated by a user, and an output section 208 including an LCD, a CRT, a speaker, etc., for displaying various kinds of information to the user are connected to the input/output interface 206. In addition, a communication section 209 functioning as a data transmission and reception means, and furthermore, a removable recording medium 211, such as a magnetic disk, an optical disk, an optical magnetic disk, or a semiconductor memory, can be loaded. A drive 210 for performing a data reading or writing process from or into the removable recording medium 211 is connected thereto.

Figure 2:
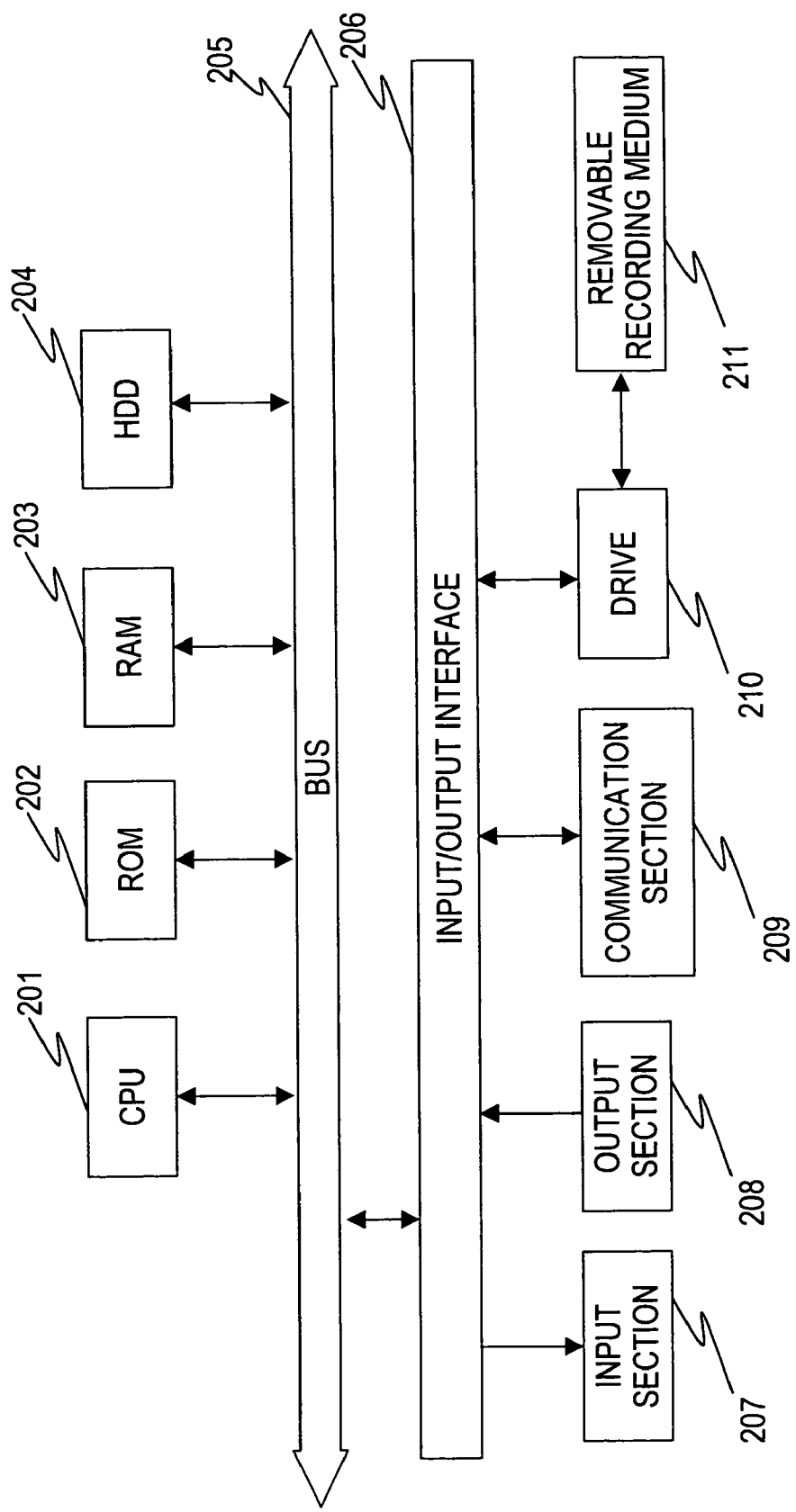
FIG. 2 illustrates an example of the configuration of a network-connected device.

The configuration shown in FIG. 2 shows an example of the server or the personal computer (PC) as an example of the network-connected device shown in FIG. 1. As shown in FIG. 1, the network-connected device, not being limited to a PC, can be formed by a portable communication terminal, such as a cellular phone, a PDA, etc., and by various other electronic devices and information processing apparatuses, such as a player, a display, etc. Therefore, it is possible to have a hardware configuration unique to each device, and a process in accordance with the hardware is performed.

Figure 3:
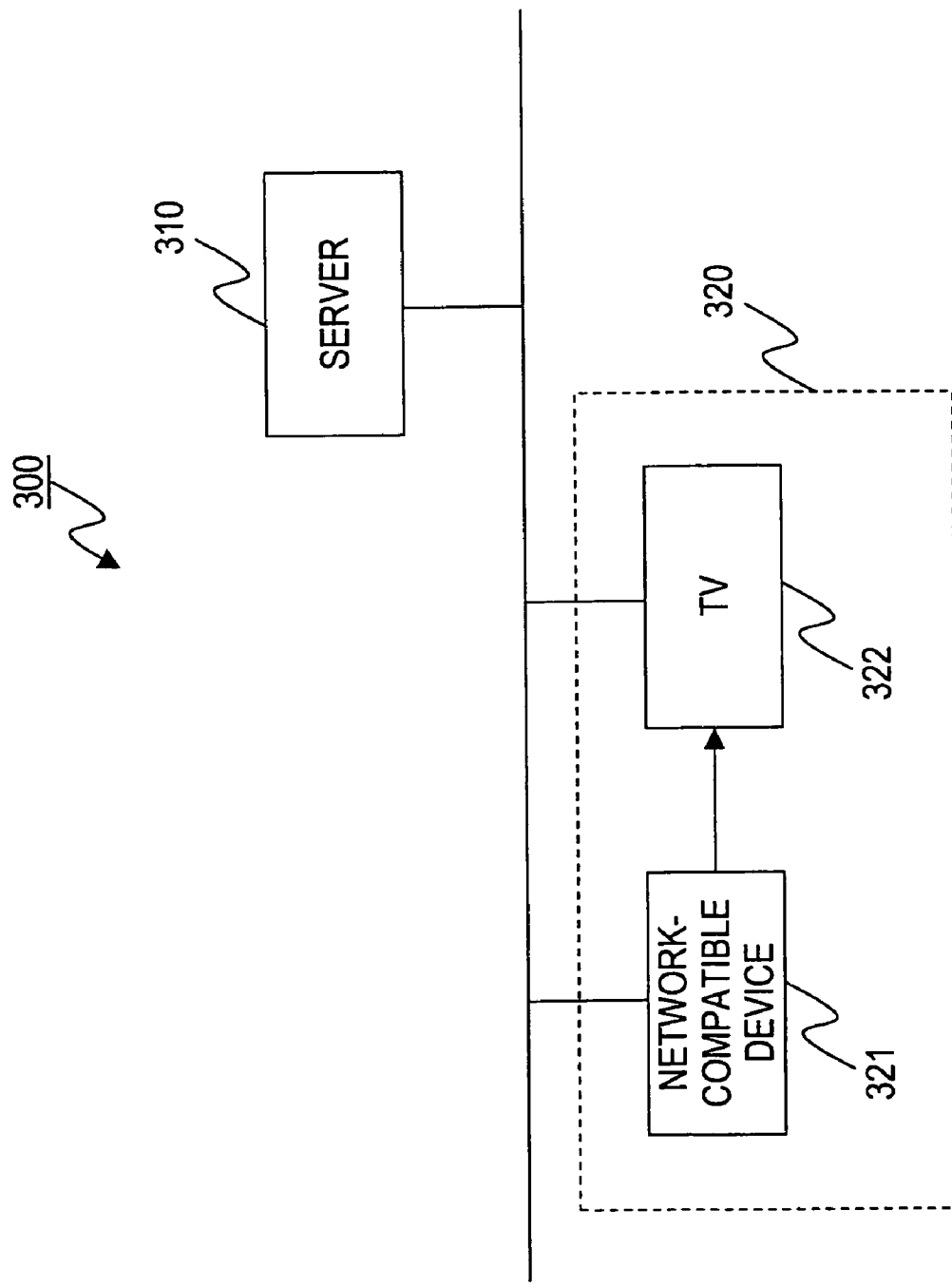
FIG. 3 is a block diagram showing the configuration of a home network according to an embodiment of the present invention.

FIG. 3 is a block diagram showing an example of the minimum configuration of a server 310 and a client 320 of a home network 300 to which the device authentication apparatus of the present invention is applied. The network formed by the server 310 and the client 320 shown in this figure provides the above-described commonly called UPnP (universal plug-and-play) environment. In the example shown in FIG. 3, it is assumed that the client 320 is formed of a network-compatible device 321 for performing various communication processing with the server, and a television receiver 322 for displaying, for example, content received from the server.

The server 310 provides various kinds of application functions and content data in response to a request from the network-compatible device 321. The network-compatible device 321, which is hardware functioning as a control point of the home network 300, requests the server 310 to perform specified services in accordance with an event which occurs in response to user operation, and processes services provided from the server 321 in response to that request.

In such network configuration, for example, when MPEG-compressed video materials are stored in the server 310, and the network-compatible device 321 requests the sending of the video materials, the server 310 sends the video materials in response to a request from the network-compatible device 321, and in the network-compatible device, a video signal such that the MPEG-compressed video materials are decoded (decompressed) is supplied to the television receiver 322, whereby video playback is performed.

[Configuration of Device Authentication Apparatus]

Figure 4:
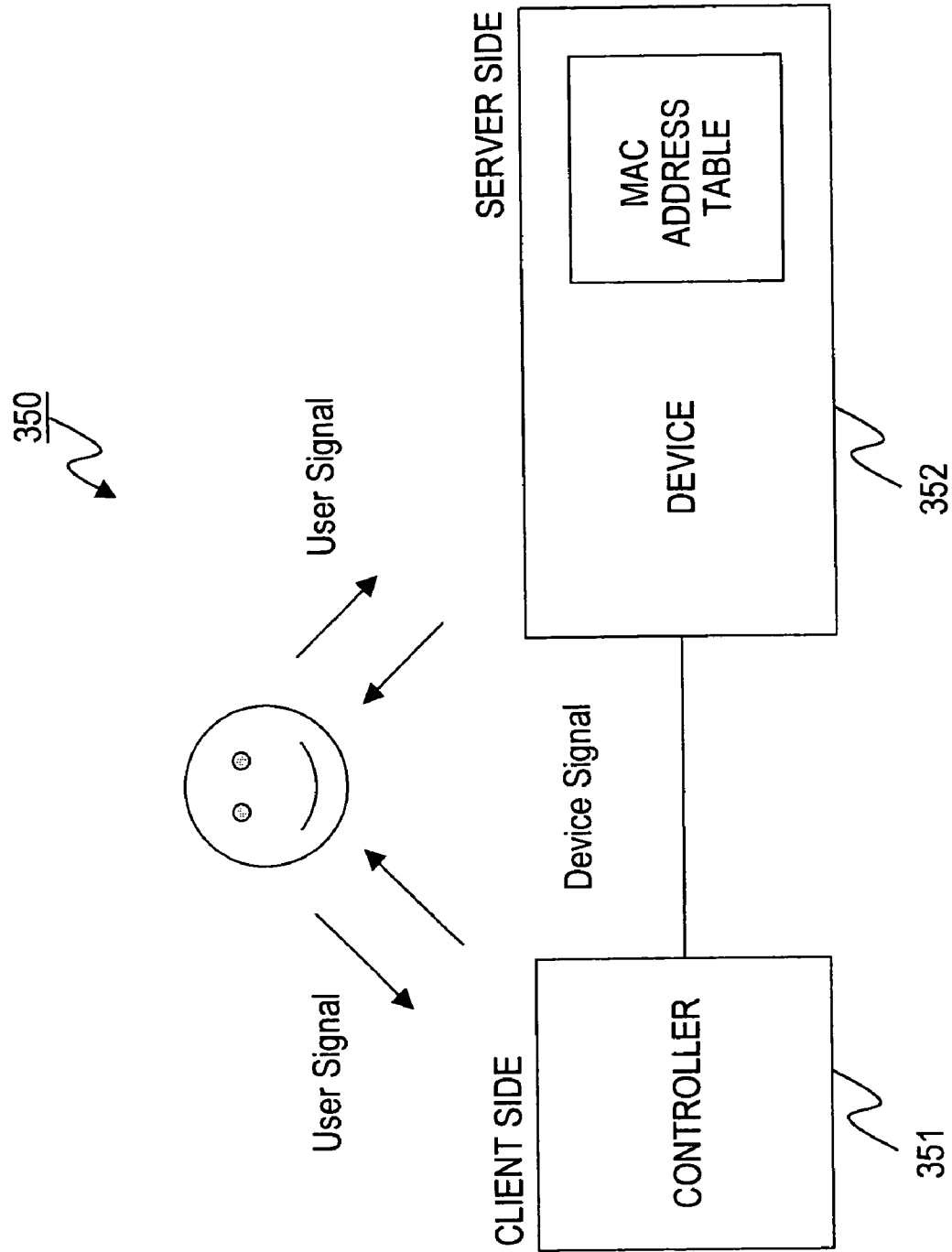
FIG. 4 is a block diagram showing the functional configuration of a device authentication apparatus.

In the above-described home network, a device authentication apparatus for preventing unauthorized access from another user within the same subnet is incorporated in the server and the network-compatible device. FIG. 4 is a block diagram showing the functional configuration of the device authentication apparatus.

A device authentication apparatus 350, which is a program aggregate formed from various types of routines called "methods" which define an operation on an object, is a virtual apparatus formed of a controller 351 implemented on the client side, that is, the network-compatible device, and a device 352 implemented on the server side.

The controller 351 generates a user signal in response to user operation, for example, the pressing of the registration button, performed at the registration request time. In the controller 351, the registration request is broadcast at the UDP layer in accordance with the user signal generated in response to the user operation. Furthermore, the controller 351 receives a method unicast at the TCP layer from the device 352 side, sends back a response, and generates a device signal for displaying content corresponding to the received method.

On the other hand, the device 352 generates a user signal in response to user operation, for example, the pressing of the confirmation button, performed at the registration confirmation time. In the device 352, when a registration request broadcast from the controller 351 side is received, in accordance with a user signal generated in response to the user operation, the MAC address on the client side is registered in the MAC address table so as to perform device authentication, and also the fact that authentication and registration is performed is unicast at the TCP layer to the controller 351 side which has issued the registration request.

The device 352 receives a response which is sent back by unicast at the TCP layer from the controller 351 side, and generates a device signal for displaying content corresponding to the received response. In response to the predetermined user operation, the device 352 instructs the deletion of all or some of the MAC addresses registered in the MAC address table. Furthermore, in the device 352, access from a device having a MAC address other than that authenticated and registered in the MAC address table is rejected, and nothing is sent back.

Therefore, in the home network 100 including such a device authentication apparatus 350 formed of the controller 351 and the device 352, even if a router for separating from another user within the same subnet is not disposed, while the device authentication apparatus 350 avoids access from an unauthorized party which is not authenticated and registered, access control having high security becomes possible so that the presence of the server 1 is not known to the controller 351 side which attempts to illegally perform device authentication.

Client Registration Process Example—First Embodiment

Figure 6:
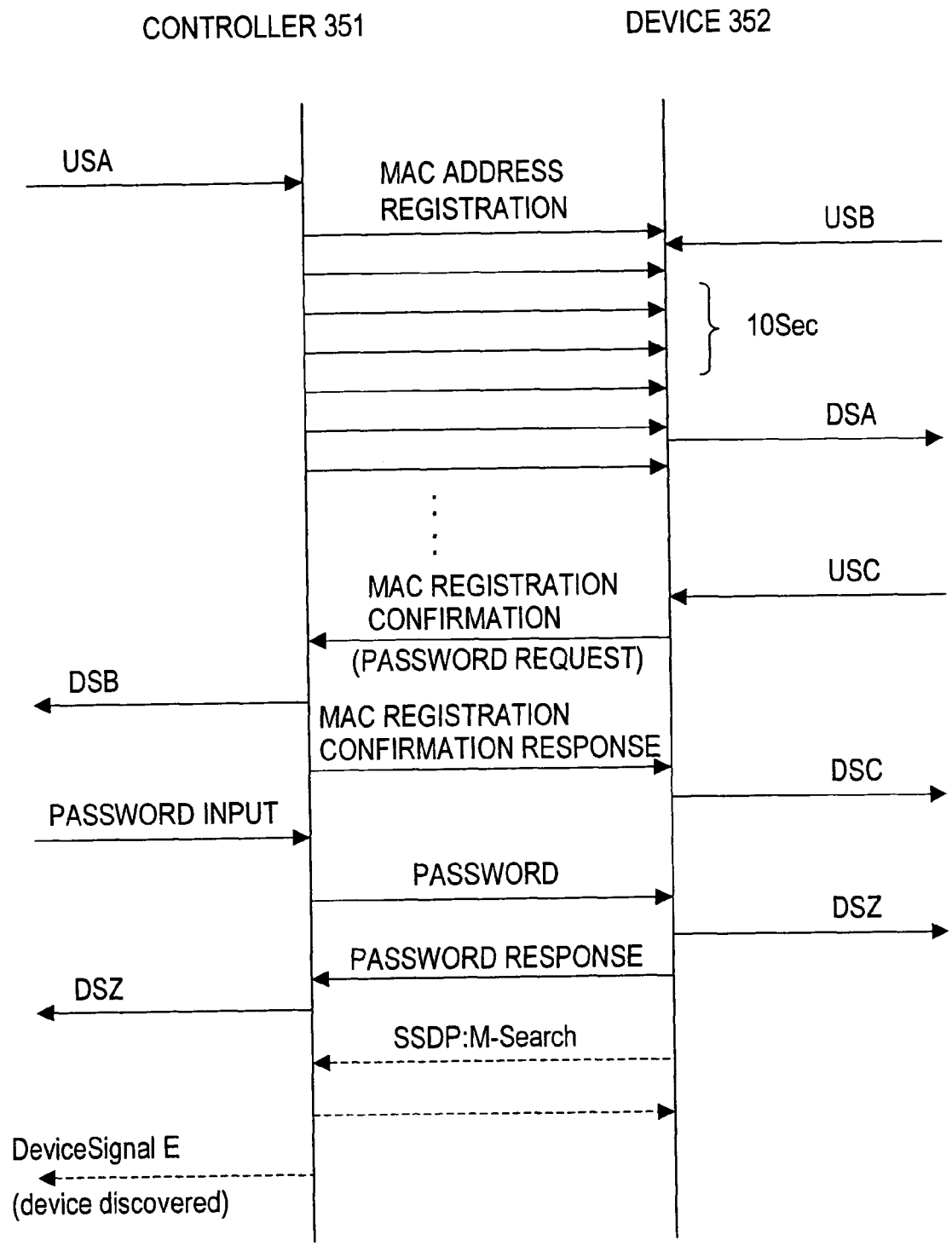
FIG. 6 is a sequence diagram showing a case in which device authentication is performed using a password in the first embodiment of the client registration process example.
Figure 7:
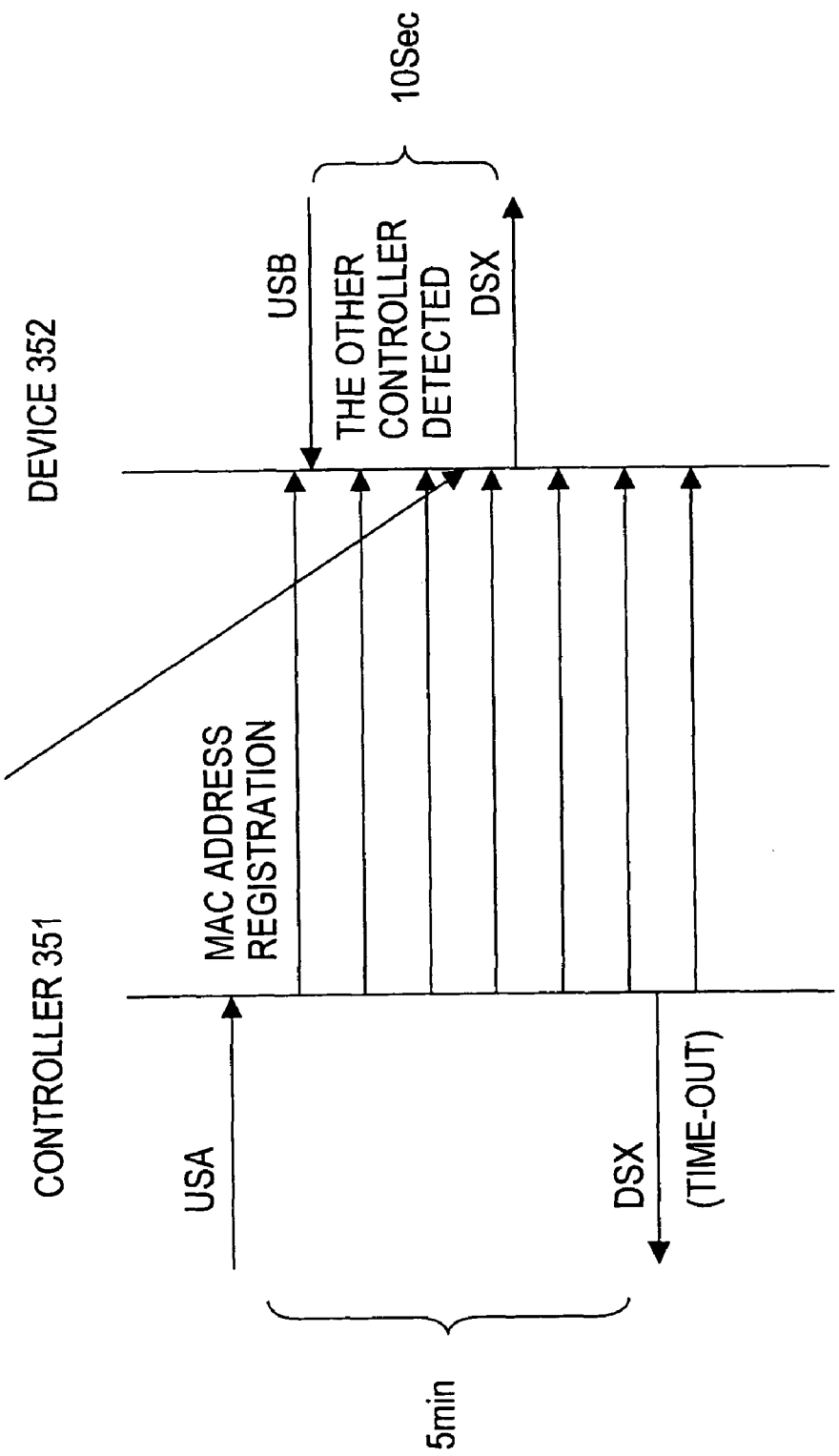
FIG. 7 is a sequence diagram showing an operation in a case where MAC address registration methods conflict.

A description will now be given, with reference to FIGS. 5 to 7, a first embodiment of client registration processing by the device authentication apparatus 350. Here, an operation (procedure) will be described in which, in the home network shown in, for example, FIGS. 1 and 3, a new network-compatible device including the controller 351 is connected, and the controller 351 implemented in the new network-compatible device (on the client side) requests the device 352 on the server side to perform authentication and registration.

The device authentication apparatus 350 has a mode in which device authentication is performed without using a password, and a mode in which device authentication is performed using a password. In the following, the operation will be described separately for each mode.

(1) Case Without One-Time Password

Figure 5:
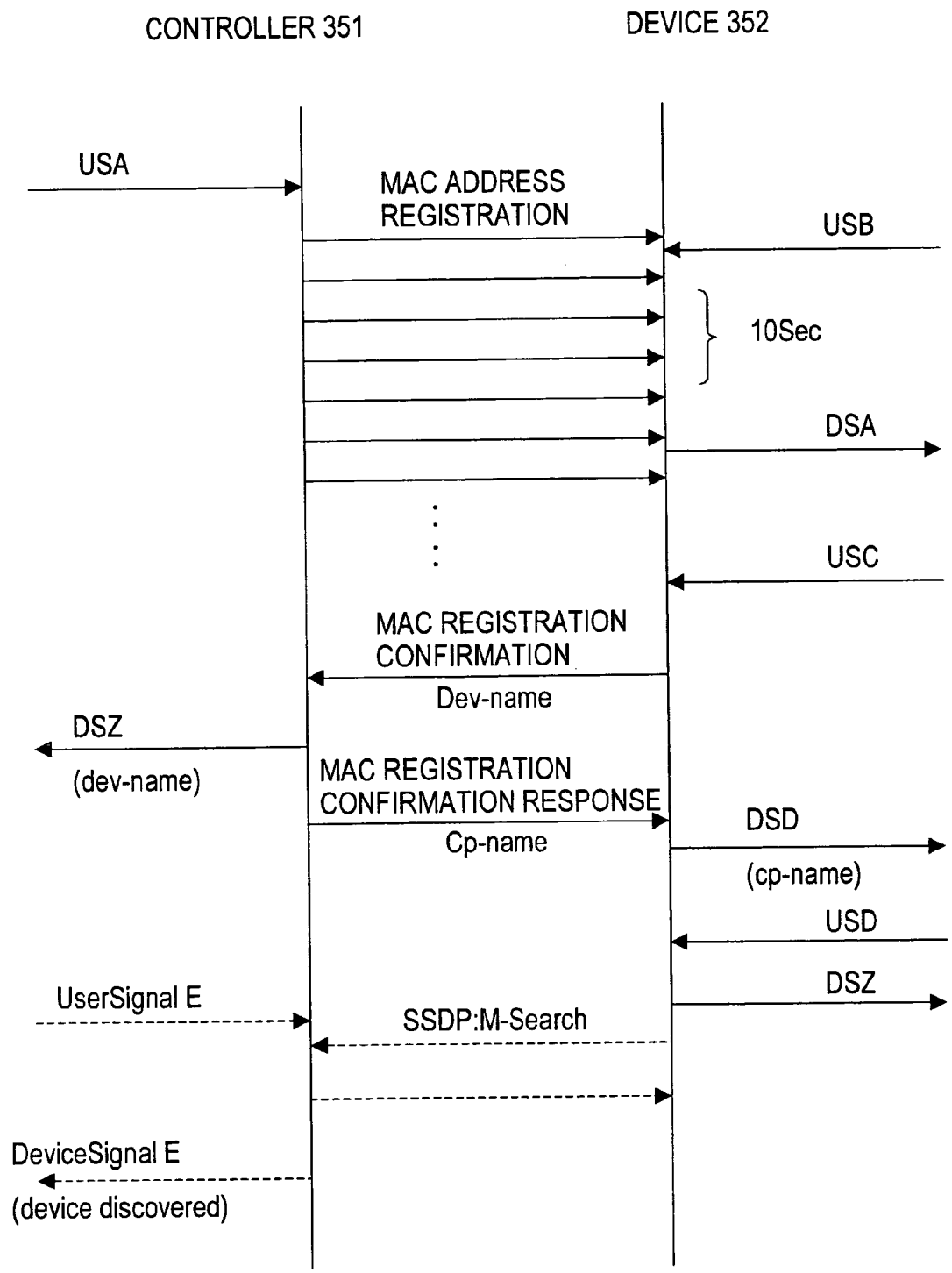
FIG. 5 is a sequence diagram showing a case in which device authentication is performed without using a password in a first embodiment of a client registration process example.

In the mode in which device authentication is performed without using a password, authentication and registration are performed in the sequence shown in FIG. 5. A description will now be given with reference to the sequence shown in FIG. 5. Initially, the user presses a registration button provided on the client (controller 351) side. Just then, the controller 351 broadcasts a MAC address registration method at the UDP layer in accordance with a user signal A (USA) which is generated in response to the pressing of the registration button. In a broadcasting mode, for example, broadcast transmission is performed every three seconds in a period of five minutes. When the controller 351 cannot receive a MAC registration confirmation method from the device 352 side until five minutes has elapsed, by determining that the authentication has failed, the operation is restarted from the beginning.

After the user presses the registration button provided on the client (controller 351) side, the user moves to the server (device 352) side. Then, the user presses the confirmation button provided on the server side. Just then, the device 352 receives the MAC address registration method in a period of 10 seconds in accordance with a user signal B (USB) which is generated in response to the pressing of the confirmation button.

When a plurality of MAC address registration methods having the same MAC address are received in a period of 10 seconds, the device 352 temporarily stores the MAC address in the MAC address table, and thereafter, generates a device signal A (DSA) for displaying for the user a message such that "A device has been discovered. Should the device be registered?", and waits for one minute in that state. This device signal A (DSA) may be omitted.

While waiting for one minute, the user presses the confirmation button provided on the server side. Just then, the device 352 unicasts the MAC registration confirmation method at the TCP layer to the controller 351 in accordance with a user signal C (USC) which is generated in response to that pressing.

In the above paragraph, in a case where the device signal A (DSA) is omitted, when MAC address registration methods having the same MAC address are received in a period of 10 seconds, the device 352 does not require the user signal C (USC) and immediately unicasts the MAC registration confirmation method at the TCP layer to the controller 35. A device name dev-name whose registration is performed is added to the MAC registration confirmation method.

When the MAC registration confirmation method is received, the controller 351 stops the transmission of the MAC address registration method, and also, the controller 351 generates a device signal Z (DSZ) for displaying for the user a message such that "The MAC registration confirmation method has been registered in the device "XXXX"" on the basis of the device name dev-name contained in the received MAC registration confirmation method. Then, the MAC registration confirmation response to which the self name cp-name is added is sent back by unicast to the device 352.

In the device 352, when the MAC registration confirmation response from the controller 351 is received, a device signal D (DSD) for displaying for the user a message such that "The controller "YYYY" can be registered. Is it really OK to register?" on the basis of the controller name cp-name contained in the MAC registration confirmation response.

Here, the user presses the confirmation button provided on the server side. Just then, in accordance with a user signal D (USD) generated in response to that pressing, the device 352 generates a device signal Z (DSZ) for displaying a message such that "The controller "YYYY" has been registered.", and the authentication and registration are completed.

After the above-described authentication and registration are completed, when M-search of the SSDP (simple service detection protocol), performed as a service searching process, is received from the controller 351, the device 352 confirms that it is a request from the registered device 352 by referring to the MAC list, and makes a response for the service search.

In the device 352, in a case where M-search of the SSDP (simple service detection protocol) is received from the controller 351 before the user signal D (USD) is received, that is, before the authentication and registration are completed, the device 352 does not respond.

(2) Case With One-Time Password

A description will now be given, with reference to the sequence shown in FIG. 6, of the operation of authentication and registration performed in a mode in which device authentication is performed using a password. Initially, the user presses the registration button provided on the client (controller 351). Just then, the controller 351 broadcasts the MAC address registration method at the UDP layer in accordance with the user signal A (USA) generated in response to the pressing of the registration button. In a broadcasting form, the broadcast is performed, for example, every three seconds in a period of five minutes. When the MAC registration confirmation from the device 352 side cannot be received until five minutes has elapsed, by determining that the authentication has failed, the operation is restarted from the beginning.

After the registration button provided on the client (controller 351) side is pressed, the user moves to the server (device 352) side. Then, the user presses the confirmation button provided on the server side. Just then, the device 352 receives, in a period of 10 seconds, the MAC address registration method in accordance with the user signal B (USB) generated in response to the pressing of the confirmation button.

When the MAC address registration method is received only from the same MAC address in a period of 10 seconds, the device 352 temporarily stores the MAC address in the MAC address table, and thereafter, generates the device signal A (DSA) for displaying for the user a message such that "A device has been discovered. Should this device be registered?", and the device 352 waits for one minute in that state.

When the MAC address registration method from the controller 351 which has already been authenticated and registered is received, the device 352 transmits the MAC registration confirmation method which means the completion of the MAC registration, and the authentication and registration are immediately terminated.

While waiting for one minute in a state in which the device signal A (DSA) is generated, the user presses the confirmation button provided on the server side. Just then, the device 352 unicasts the MAC registration confirmation method at the TCP layer in accordance with the user signal C (USC) generated in response to the pressing of the confirmation button. A password request flag is added to the MAC registration confirmation method.

When the controller 351 receives the MAC registration confirmation method to which the password request flag is added, the controller 351 stops the transmission of the MAC address registration method, and also sends back by unicast the MAC registration confirmation response to the device 352.

When the MAC registration confirmation response is received, the device 352 generates the device signal C (DSC) which displays for the user a message such that "The one-time password for the controller "YYYY" is "OOOO".", and waits for five minutes in a state in which the one-time password is displayed.

On the other hand, the controller 351 generates the device signal B (DSB) which displays a message such that "Please input the password of the device "XXXX"." on the basis of the password request flag contained in the received MAC registration confirmation method, and waits for the input of the one-time password in a period of five minutes.

During this waiting period, the user moves from the server side to the client (controller 351) side. Then, the user who has moved to the client (controller 351) side inputs a password. Just then, the controller 351 unicasts the password method to which the input password is added to the device 352 at the TCP layer, and waits for 10 seconds.

In the device 352, when the password method from the controller 351 is received in a waiting state in which the one-time password is displayed, it is verified against the one-time password which is set in advance in the device 352 itself. In the following, the operation will be described separately between the case in which the password verification is OK and the case in which the password verification is NG.

(a) Case in Which Password Verification is OK

When the one-time password sent from the controller 351 is valid, the device 352 officially authenticates and registers the MAC address which is temporarily stored in the MAC address table, and thereafter, sends back by unicast the password response in which the verification OK is added to the controller 351. Then, the device signal Z (DSZ) which displays for the user a message such that "The controller "YYYY" has been registered." is generated, completing the authentication and registration.

On the other hand, in the controller 351, when a password response in which the password verification OK is added is received from the device 352 during the waiting period in a period of 10 seconds after the password method is unicast at the TCP layer to the device 352, by determining that the MAC address is authenticated and registered, the device signal Z (DSZ) which displays for the user a message such that "It has been registered in the device "XXXX" is generated, completing the device authentication.

When the above-described authentication and registration are completed, in a case where the device 352 receives M-search of the SSDP (simple service detection protocol) performed as a service searching process from the controller 351, the device 352 confirms that is a request from the registered device 352 by referring to the MAC list, and makes a response for the services search.

In the device 352, when M-search of the SSDP (simple service detection protocol) from the controller 351 is received before the device signal Z (DSZ) is generated, that is, before authentication and registration are terminated completely, the device 352 does not respond.

(b) Case in Which Password Verification is NG

When the one-time password sent from the controller 351 is invalid, the device 352 sends back by unicast the password response to which the verification NG is added to the controller 351, and waits again for the input of the password from the controller 351 in a period of five minutes.

Then, when the password verification NG continues three times during this waiting period, the device 352 stops the retry of the input of the password, and generates the device signal Z (DSZ) which displays for the user a message such that "The controller "YYYY" cannot be registered", completing the device authentication. In this case, in the device 352, the MAC address which is temporarily stored in the MAC address table is deleted.

On the other hand, in the controller 351, when the password response in which the result code of retry stop is added is received from the device 352, the device signal Z (DSZ) which displays for the user a message such that "Cannot be registered in the device "XXXX"" is generated, completing the device authentication.

(3) Case in Which Different Controller is Detected

A description will now be given, with reference to FIG. 7, an operation in a case where another controller differing from the controller 351 which has broadcast the MAC address registration method is detected while the device 352 is receiving the MAC address registration method in a period of 10 seconds.

The user presses the registration button provided on the client (controller 351) side, and the controller 351 broadcasts the MAC address registration method at the UDP layer in accordance with the user signal A (USA) generated in response to that pressing. Thereafter, when the user moves to the server (device 352) side and presses the confirmation button provided on the server side, the device 352 receives the MAC address registration method in a period of 10 seconds in accordance with the user signal B (USB) generated in response to the pressing of the confirmation button.

During this period of 10 seconds, when a MAC address registration method from a different MAC address is received, the device 352 generates the device signal X (DSX) which displays for the user a message such that "A plurality of controllers have been discovered. The registration will not be performed", stopping the device authentication.

In this manner, when the device 352 side completes the device authentication in a one-sided manner, the controller 351 cannot receive the MAC registration confirmation method, and generates the device signal X (DSX) which displays for the user a message such that "The registration has failed" when the time limit of five minutes for broadcasting the MAC address registration method has passed, stopping the device authentication.

Furthermore, in a period of 10 seconds in which the MAC address registration method is received, when the device 352 receives a plurality of MAC address registration methods from the same MAC address within two seconds, the device 352 generates the device signal X (DSX) which displays for the user a message such that "An invalid controller has been discovered. The registration will not be performed", completing the device authentication.

Also, in this case, the controller 351 cannot receive the MAC registration confirmation method, and generates the device signal X (DSX) which displays for the user a message such that "The registration has failed" when the time limit of five minutes in which the MAC address registration method is broadcast has passed, stopping the device authentication.

In the manner described above, when the MAC address registration methods from the controller 351 conflict, the device 352 does not perform device authentication, and does not respond to any one of the controllers 351 having a conflicting MAC address so as to prevent unauthorized access and makes the presence of the device 352 itself not known to the controller 351 side which attempts to illegally perform device authentication.

Furthermore, in a stage where the MAC address registration method is broadcast from the controller 351 at the UDP layer in this procedure, when the user performs a registration operation canceling process provided in the controller 351, the controller 351 immediately stops the transmission of the MAC address registration method, and instead, broadcasts a MAC address registration stopping method several times, completing the processing. When the device which is receiving this MAC address in a period of 10 seconds receives this MAC address registration stopping method, the device immediately stops the processing and displays for the user a message such that "The registration of the device has been cancelled".

As has been described above, according to this embodiment, when the user presses the registration button on the client (controller 351) side, the controller 351 broadcasts the MAC address registration method on the network at a fixed period for a fixed time. When the user presses the confirmation button on the server side, in a case where the device 352 receives the MAC address registration method having the same MAC address within a fixed time, that MAC address is temporarily stored in the MAC address table. When the user presses the confirmation button on the server side, the device 352 unicasts the MAC registration confirmation method to the controller 351, and the controller 351 receiving the MAC registration confirmation method sends back by unicast a MAC registration confirmation response to the device 352. Then, the device 352 receives the MAC registration confirmation response and promotes the user to perform authentication and registration. When the user presses the confirmation button provided on the server side in response to that promotion, the MAC address which is temporarily stored in the MAC address table is authenticated and registered.

In this manner, only the MAC address of the controller 351 (client) authorized by the user is authenticated and registered in the MAC address table of the device 352, and the device 352 performs MAC address filtering for allowing access to the controller 351 (client) of the MAC address which is authenticated and registered in the MAC address table. As a result, even if a router is not disposed to separate from another user within the same subnet, while the device authentication apparatus 350 avoids access from an unauthorized party which is not authenticated and registered, the device authentication apparatus 350 make the presence of the server 1 not known to the controller 351 side which attempts to illegally perform device authentication. Therefore, it is possible to provide access control with high security.

The device authentication apparatus 350 of the present invention can realize a function for protecting the copyright by using the above-described access control. That is, for performing device authentication, as described above, it is necessary for the user to operate both the confirmation button provided on the server side and the registration button provided on the client (controller 351) side.

Therefore, the controller 351 (client) of the other user within the same subnet cannot be authenticated on the home network 100 side. As a result, a situation in which the server 1 of the home network 100 is illegally accessed, and the copyright of the content stored in the server 1 is infringed does not occur.

Furthermore, in the above-described embodiment, for the sake of simplicity of description, the device authentication apparatuses 350 disposed in a pair of server/client have been described as an example. The gist of the present invention is not limited to this example, and of course, the present invention can be applied to a network having a plurality of servers and a plurality of clients. That is, when a plurality of servers (devices 352) exist, if the confirmation button is pressed in the server for which the user is going to perform device authentication, the server inevitably becomes the authentication source.

Client Registration Process Example—Second Embodiment

A description will now be given, with reference to FIGS. 8 and 9, a second embodiment of the client registration processing. In the second embodiment, the registration completion (Complete) confirmation process is performed as the final step of the MAC registration process.

Also, in this embodiment, a mode in which device authentication is performed without using a password and a mode in which device authentication is performed using a password are provided. In the following, the operation will be described separately for each mode.

(1) Case Without One-Time Password

Figure 8:
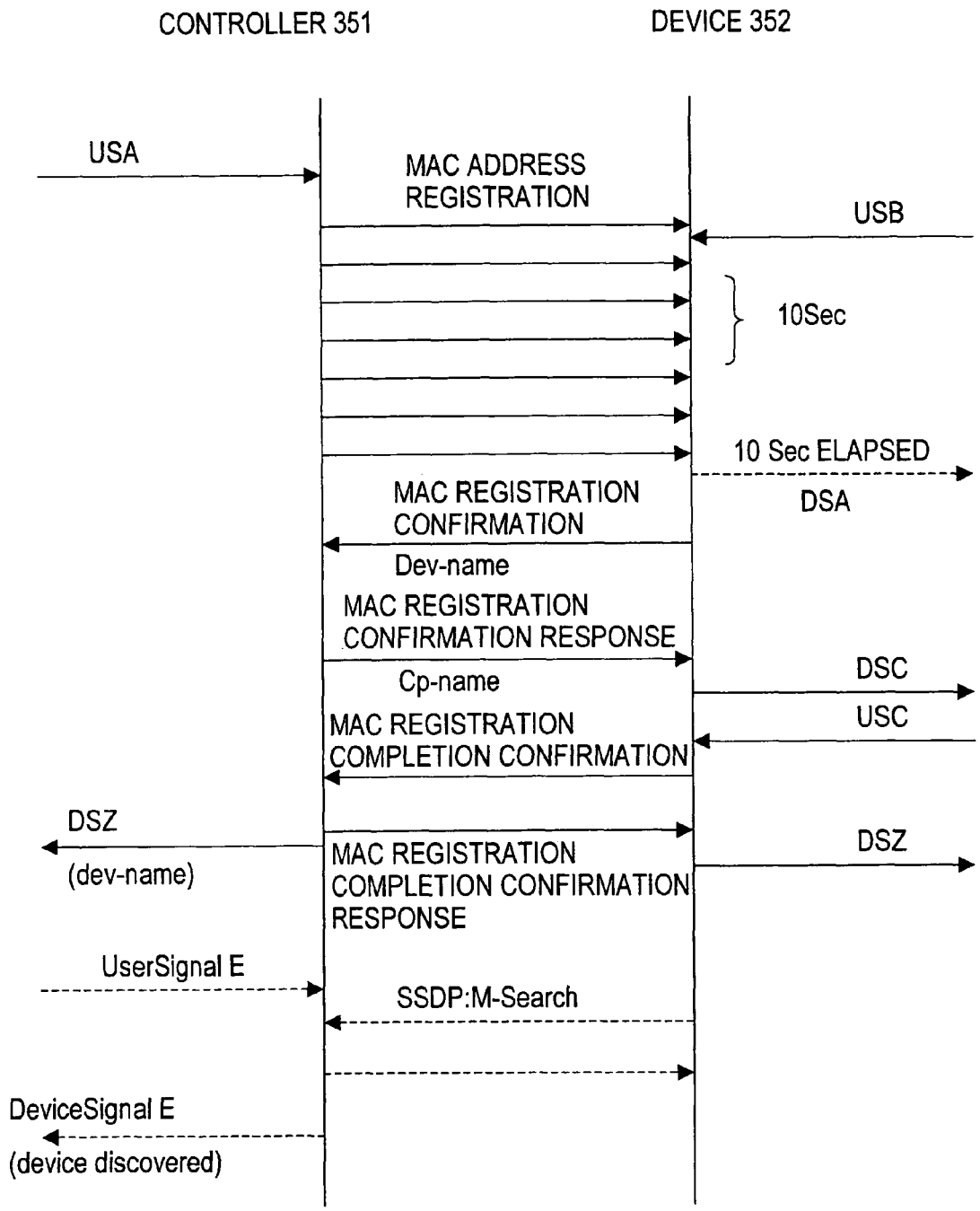
FIG. 8 is a sequence diagram showing an operation in a case where device authentication is performed without using a password in a second embodiment of a client registration process example.
Figure 9:
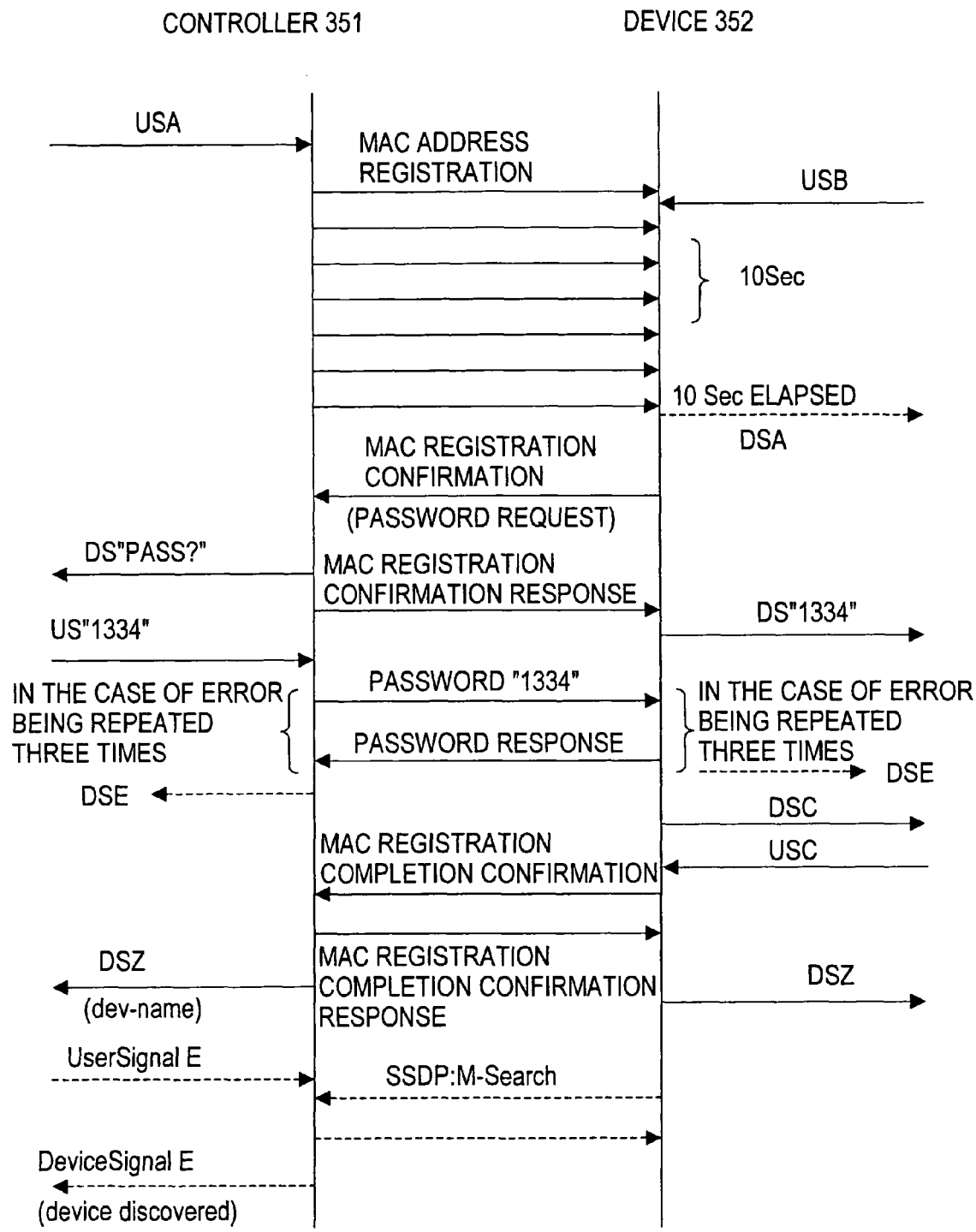
FIG. 9 is a sequence diagram showing an operation in a case where device authentication is performed in the second embodiment of the client registration process example.

In the mode in which device authentication is performed without using a password, authentication and registration are performed in the sequence shown in FIG. 8. A description will now be given with reference to the sequence shown in FIG. 8. Initially, the user presses the registration button provided on the client (controller 351) side. Just then, the controller 351 broadcasts the MAC address registration method at the UDP layer in accordance with the user signal A (USA) generated in response to the pressing of the registration button. In a broadcasting form, broadcast transmission is performed, for example, every three seconds in a period of five minutes. When the controller 351 cannot receive the MAC registration confirmation method from the device 352 side until five minutes has elapsed, by determining that the authentication has failed, the operation is restarted from the beginning.

After the registration button provided on the client (controller 351) side is pressed, the user moves to the server (device 352) side. Then, the confirmation button provided on the server side is pressed. Just then, the device 352 receives the MAC address registration method in a period of 10 seconds in accordance with the user signal B (USB) generated in response to the pressing of the confirmation button.

When a plurality of MAC address registration methods having the same MAC address are received in a period of 10 seconds, the device 352 temporarily stores the MAC address in the MAC address table, and thereafter, unicasts the MAC registration confirmation method at the TCP layer to the controller 351. In the MAC registration confirmation method, the device name dev-name whose registration is performed is added.

When a plurality of MAC address registration methods having the same MAC address are not received in a period of 10 seconds, the device 352 generates the device signal A (DSA) which displays a message such that "A device could not be discovered", completing the device authentication.

When the MAC registration confirmation method is received, the controller 351 stops the transmission of the MAC address registration method, and also sends back by unicast the MAC registration confirmation response in which the self-name cp-name is added to the device 352. Thereafter, the controller 351 shifts to a state of waiting for the reception of the MAC registration completion confirmation method.

In the device 352, when the MAC registration confirmation response from the controller 351 is received, the device signal C (DSC) which displays for the user a message such that "The controller "YYYY" can be registered. Is it really OK to register?" is generated on the basis of the controller name cp-name contained in the MAC registration confirmation response.

Here, the user presses the confirmation button provided on the server side. Just then, the device 352 performs a registration process in accordance with the user signal C (USC) generated in response to that pressing, and also unicasts the MAC registration completion confirmation method at the TCP layer to the controller 351. In the MAC registration completion confirmation method, the device name dev-name whose registration is completed is added.

When the MAC registration completion confirmation method is received, the controller 351 sends back by unicast the MAC registration completion confirmation response to the device 352. Furthermore, based on the device name dev-name contained in the received MAC registration completion confirmation method, the device signal Z (DSZ) which displays for the user a message "Has been registered in the device "XXXX"" is generated.

The device 352 waits for a predetermined time, for example, 10 minutes from when the MAC registration completion confirmation method was transmitted. Upon reception of the MAC registration completion confirmation response from the controller 351, the device 352 generates the device signal Z (DSZ) which displays for the user a message such that "The controller "YYYY" has been registered", completing the authentication and registration.

In a case where the device 352 waits for a predetermined time, for example, 10 minutes, from when the MAC registration completion confirmation method was transmitted, and the MAC registration completion confirmation response is not received from the controller 351, two settings are possible. One is a processing mode in which the registration is made effective regardless of the presence or absence of the reception of the MAC registration completion confirmation response, and the device signal Z (DSZ) which displays for the user a message such that "The controller "YYYY" has been registered" is generated, completing the authentication and registration.

Another processing mode is a mode in which, when the device 352 does not receive the MAC registration completion confirmation response from the controller 351 within a predetermined time, the registration is made invalid, and a message such that "The registration of the controller "YYYY" has been cancelled" is displayed for the user on the device 352 side, completing the processing. For performing this registration invalidation process, preferably, the device 352 transmits the registration cancellation notification to the controller 351, and displays for the user a message such that "The registration for the device "XXXX" has been cancelled" at the controller 351.

As processes in a case where the device 352 has not received the MAC registration completion confirmation response from the controller 351 for a predetermined time, the above-described two processing modes can be set.

When the controller 351 is registered in the MAC list of the device 352 and the authentication and registration are completed, thereafter, the device 352 receives M-search of the SSDP (simple service detection protocol) performed as a service searching process from the controller 351, confirms that this is a request from the registered device 352 by referring to the MAC list, and responds to the service search.

When the device 352 receives M-search of SSDP (simple service detection protocol) from the controller 351 before the authentication and registration are completed, since the controller 351 is not yet registered in the MAC list, the device 352 does not respond.

(2) Case With One-Time Password

A description will now be given, with reference to the sequence shown in FIG. 9, the operation of authentication and registration performed in the mode in which device authentication is performed using a password. Initially, the user presses the registration button provided on the client (controller 351) side. Just then, the controller 351 broadcasts the MAC address registration method at the UDP layer in accordance with the user signal A (USA) generated in response to the pressing of the registration button. In a broadcasting form, broadcast transmission is performed, for example, every three seconds in a period of five minutes. When the controller 351 cannot receive the MAC registration confirmation method from the device 352 side until five minutes has elapsed, by determining that the authentication has failed, the operation is restarted from the beginning.

The user presses the registration button provided on the client (controller 351) side, and thereafter, moves to the server (device 352) side. Then, the confirmation button provided on the server side is pressed. Just then, the device 352 receives the MAC address registration method in a period of 10 seconds in accordance with the user signal B (USB) generated in response to the pressing of the confirmation button.

When a plurality of MAC address registration methods having the same MAC address are received in a period of 10 seconds, the device 352 temporarily stores the MAC address in the MAC address table, generates the device signal A (DSA) which displays for the user a message such that "A device has been discovered", and unicasts the MAC registration confirmation method at the TCP layer. In the MAC registration confirmation method, a password request flag is added.

When a plurality of MAC address registration methods having the same MAC address are not received in a period of 10 seconds, the device 352 generates the device signal A (DSA) which displays a message such that "A device could not be discovered", completing the device authentication.

When the MAC registration confirmation method in which the password request flag is added is received, the controller 351 stops the transmission of the MAC address registration method, and sends back by unicast the MAC registration confirmation response to the device 352.

When this MAC registration confirmation response is received, the device 352 generates the device signal C (DSC) which displays for the user a message such that "The one-time password for the controller "YYYY" is "○○○○".", and waits for five minutes in a state in which the one-time password is displayed. In FIG. 9, as a password, [1334] is shown as an example. This password is generated by the device 352, for example, by a random number generation process.

On the other hand, based on the password request flag contained in the received MAC registration confirmation method, the controller 351 generates the device signal B (DSB) which displays for the user a message such that "Please input the password of the device "XXXX"", and waits for an input of the one-time password for five minutes.

During this waiting period, the user moves from the server side to the client (controller 351) side. Then, the user who has moved to the client (controller 351) side inputs the password displayed on the device 352 side from the input means on the client (controller 351) side. Just then, the controller 351 unicasts the password method in which the input password is added to the device 352 at the TCP layer, and waits for 10 minutes.

In the device 352, when the password method from the controller 351 is received in the waiting state of five minutes after the one-time password is displayed, it is verified against the one-time password set in advance in its own device. In the following, the operation will be described separately between the case of the password verification OK and the case of the password verification NG.

(a) Case in Which Password Verification is OK

When the one-time password sent from the controller 351 is valid, that is, it matches the one-time password set by the device, the device 352 officially authenticates and registers the MAC address which is temporarily stored in the MAC address table, and thereafter, sends back by unicast the password response in which the verification OK is added to the controller 351.

During the waiting period for 10 minutes after the password method is unicast to the device 352 at the TCP layer, when the password response in which the verification OK is added is received from the device 352, the controller 351 shifts to the waiting state for receiving the MAC registration completion confirmation method.

Furthermore, the device 352 generates the device signal C (DSC) which displays for the user a message such that "The controller "YYYY" can be registered. Is it really OK to register?" based on the controller name cp-name.

Here, the user presses the confirmation button provided on the server side. Just then, the device 352 performs a registration process in accordance with the user signal C (USC) generated in response to that pressing, and also unicasts to the controller 351 the MAC registration completion confirmation method at the TCP layer. In the MAC registration completion confirmation method, the device name dev-name whose registration has been completed is added.

When the MAC registration completion confirmation method is received, the controller 351 sends back by unicast the MAC registration completion confirmation response to the device 352. Furthermore, based on the device name dev-name contained in the received MAC registration completion confirmation method, the device signal Z (DSZ) which displays for the user a message such that "Has been registered in the device "XXXX"." is generated.

When the device 352 waits for a predetermined time, for example, 10 seconds from when the MAC registration completion confirmation method is transmitted and receives the MAC registration completion confirmation response from the controller 351, the device 352 generates the device signal Z (DSZ) which displays for the user a message such that "The controller "YYYY" has been registered", completing the authentication and registration.

When the device 352 waits for a predetermined time, for example, 10 seconds from when the MAC registration completion confirmation method is transmitted and the MAC registration completion confirmation response is not received from the controller 351, two settings are possible. One is a processing mode in which the registration is made effective regardless of the presence or absence of the reception of the MAC registration completion confirmation response, the device signal Z (DSZ) which displays for the user a message such that "The controller "YYYY" has been registered" is generated, completing the authentication and registration.

Another processing mode is a mode in which, when the device 352 does not receive the MAC registration completion confirmation response from the controller 351 within a predetermined time, the registration is invalidated, and the device 352 side displays for the user a message such that "The registration of the controller "YYYY" has been cancelled", completing the processing. For performing this registration invalidation processing, preferably, the device 352 transmits this registration cancellation notification to the controller 351 and a message such that "The registration for the device "XXXX" has been cancelled" is displayed for the user in the controller 351.

As processes in a case where the device 352 does not receive the MAC registration completion confirmation response from the controller 351 for a predetermined time, settings of the above-described two processing modes are possible.

After the controller 351 is registered in the MAC list of the device 352, and the authentication and registration are completed, when M-search of the SSDP (simple service detection protocol) performed as a service searching process from the controller 351 is received, the device 352 confirms that this is a request from the registered device 352 by referring to the MAC list, and responds to the service search.

When the device 352 receives M-search of the SSDP (simple service detection protocol) from the controller 351 before the authentication and registration are terminated completely, since the controller 351 is not yet registered in the MAC list, the device 352 does not respond.

(b) Case in Which Password Verification is NG

When the one-time password sent from the controller 351 is invalid, that is, does not match the one-time password set by the device, the device 352 sends back by unicast the password response in which the password verification NG is added to the controller 351, and waits for the password to be input again from the controller 351 in a period of five minutes.

Then, when the password verification NG continues three times during this waiting period, the device 352 stops the retry of the password input, and generates a device signal E (DSE) which displays for the user a message such that "The controller "YYYY" cannot be registered", completing the device authentication. In this case, in the device 352, the MAC address which is temporarily stored in the MAC address table is deleted.

On the other hand, in the controller 351, when the password response in which the result code for the retry stop is added is received from the device 352, the device signal E (DSE) which displays for the user a message such that "Registration for the device "XXXX" is not possible" is generated, completing the device authentication.

In this second embodiment, the operation in a case where another controller differing from the controller 351 which has broadcast the MAC address registration method is detected while the device 352 is receiving the MAC address registration method in a period of 10 seconds becomes processing (see FIG. 7) similar to that of the first embodiment, and the device 352 displays for the user a message such that "A plurality of controllers have been discovered. Registration will not be performed", stopping the device authentication.

In this manner, when the device 352 side completes the device authentication in a one-sided manner, the controller 351 cannot receive the MAC registration confirmation method, displays for the user a message such that "The registration has failed" when the time limit of five minutes for broadcasting the MAC address registration method has passed, stopping the device authentication.

Furthermore, in a period in which the MAC address registration method is received for 10 minutes, when the device 352 receives a plurality of MAC address registration method from the same MAC address within two seconds, the device 352 displays for the user a message such that "An invalid controller has been discovered. The registration will not be performed", completing the device authentication.

Also, in this case, the controller 351 cannot receive the MAC address registration method, and displays for the user a message such that "The registration has failed" when the time limit of five minutes for broadcasting the MAC registration confirmation method has passed, stopping the device authentication.

In this manner, when the MAC address registration methods from the controller 351 conflict, the device 352 does not perform the device authentication and does not respond to any one of the controllers 351 having a conflicting MAC address so as to prevent unauthorized access, and also makes the presence of the device 352 itself not known to the controller 351 side which attempts to illegally perform device authentication.

As has been described above, according to the processing structure of this second embodiment, in the final step of the MAC registration process, the registration completion (Complete) confirmation process is performed, and the MAC registration completion confirmation is transmitted from the server (device) side to the client (controller) side. As a result, it becomes possible for the user to confirm the final registration completion on the basis of the registration completion message at the two devices.

Furthermore, on the client (controller) side, if a process for transmitting M-search of the SSDP (simple service detection protocol) as a service searching process is performed under the condition that the MAC registration completion confirmation notification is received from the server (device) side, since it is guaranteed that the MAC registration is completed on the server (device) side, it becomes possible to reliably receive the response for the service searching process.

This processing sequence may be automatically performed on the basis of the program of the device on the client (controller) side without performing the explicit M-search transmission process starting command by the user. That is, the M-search transmission process is performed automatically under the condition that the MAC registration completion confirmation notification is received from the server (device) side. By setting such an automatic execution processing sequence, it becomes possible for the client to receive service information from the server following the registration process for the server without the intervention of a user's input process, etc.

[Registration Request from Registered Controller]

Figure 10:
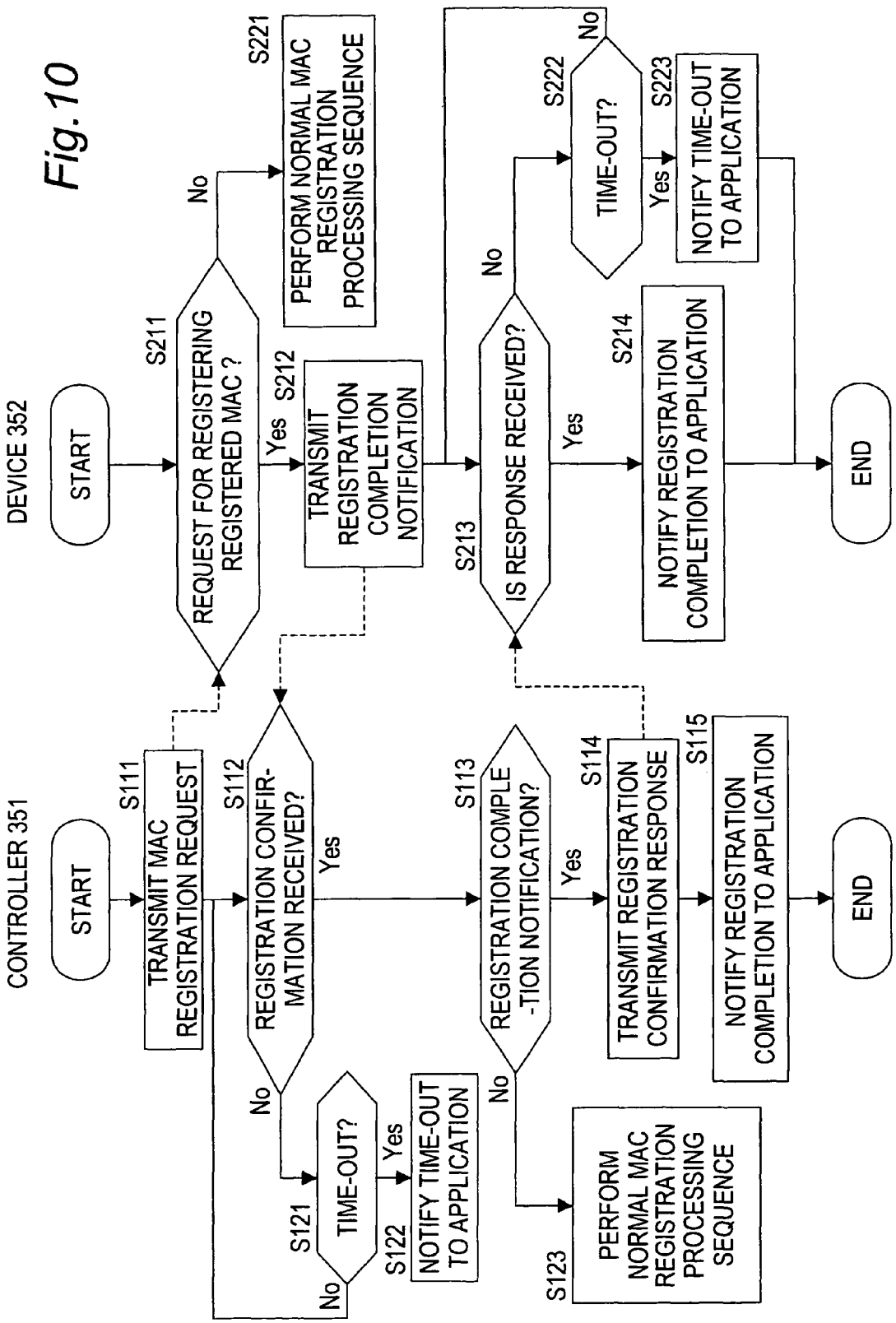
FIG. 10 is a flowchart illustrating operations with emphasis on a registration completion notification process in the client registration process.

A description will now be given, with reference to the flowchart in FIG. 10, of processing in a case where a MAC address registration request is made from the client (controller) which has already been registered in the MAC list on the server (device) side.

In the normal registration process, as described above, when the server (device) receives the MAC address registration request from the client (controller), the MAC registration confirmation is transmitted to the client. However, when the MAC address contained in the registration request is the same as that registered in the MAC list possessed by the server, the client (controller) transmits a registration completion notification indicating that the MAC address has already been registered to the server (device). Each step of the flowchart shown in FIG. 10 will now be described.

Initially, in step S111, the controller 351 on the client side broadcasts at the UDP layer the MAC address registration method on the basis of user instruction. In step S211, the device 352 on the server side determines whether or not the MAC address contained in the MAC registration request from the controller has been registered in the MAC list. When the MAC address is not contained in the list, in step S221, the normal MAC registration process sequence is performed. This is a process corresponding to each of the above-described process examples.

On the other hand, when it is determined in step S211 that the MAC address contained in the MAC registration request from the controller is registered in the MAC list, in step S212, the device 352 transmits, as a MAC registration confirmation, a registration confirmation notification indicating that the registration has been completed to the controller 351 on the client side.

After the MAC registration request is transmitted in step S111, the controller 351 on the client side waits for the registration confirmation. When the registration confirmation is not received within the waiting time (step S112: No, step S121: Yes), in step S122, a time-out notification is made to a high-order application program, and a message displaying process for indicating that the reception of the registration confirmation has failed is performed by the high-order application program.

When the registration confirmation is received within the specified time, the process proceeds to step S113, where it is determined whether or not the registration confirmation is a registration completion notification. If the registration confirmation is not a registration completion notification, the process proceeds to step S123, where a normal MAC registration process sequence is performed. This is a process corresponding to each of the above-described processing examples. When the registration confirmation is a registration completion notification, the process proceeds to step S114, where a registration confirmation response as an acknowledgement response message for the registration completion notification is transmitted to the server (device) side.

After the registration completion notification is transmitted in step S212, the server (device 352) waits for the registration confirmation response. When the registration confirmation response is not received within the waiting time (step S213: No, step S222: Yes), in step S223, a time-out notification is made to the high-order application program, and a message displaying process for indicating that the reception of the registration confirmation response has failed is performed in accordance with the high-order application program, completing the processing.

When the registration confirmation response is received within the waiting time (step S213: Yes), in step S214, a registration completion notification is made to the high-order application program. The high-order application program executes, for example, a message displaying process for indicating that the registration has already been completed.

On the other hand, the client (controller 351), which has transmitted to the server (device) side a registration confirmation response as an acknowledgement response message for the registration completion notification in step S114, makes a registration completion notification to the high-order application program in step S115. The high-order application program executes, for example, a message displaying process for indicating that the registration has already been completed, completing the processing.

In this manner, when a MAC registration request occurs from the client which has already been registered in the MAC list of the server, since a confirmation notification process for indicating that the registration has been completed is performed among devices, a message display for indicating that the registration has been completed becomes possible on the basis of these notifications, and it becomes possible for the user to confirm that the client device has already been registered in the server.

[Version Management in Registration Requesting Process]

As described in the first embodiment and the second embodiment of the above-described client registration process example, there are cases in which the device registration process sequence performed between the server and the client is performed in accordance with a different sequence. This results in that the processing sequence may differ depending on the version of the device authentication program stored in the client or the server. For example, these are defined as different versions, such as the first embodiment of the above-described client registration process example being as the program of version 1.0, and the second embodiment thereof being as the program of version 1.1.

When the device authentication processing programs stored in both the server and the client are at the same version, the processing will be performed in accordance with their matching processing sequence. When a processing program of a different version is stored in the two devices, if each program performs a process in accordance with a different processing sequence, the result is that a normal device registration process will not be performed.

Accordingly, in the configuration of the present invention, the version information of the processing program is notified between the server and the client, and the device registration is performed with the processing sequences being made to match each other.

The versions of the processing programs are set in sequence as [1.0], [1.1], [1.2] ..., [2.0], [2.1] ... from the old version to the new version. Two values of [x. y] are defined as x=the major version and y=the minor version.

Here, for programs with an equal major version, a newer version supports a processing sequence of an older version. That is, version [1.2] supports [1.0] and [1.1]. Version [2.1] supports [2.0]. The processing based on the notification of the version information in the device registration process sequence will now be described with reference to FIGS. 11 and 12.

Figure 11:
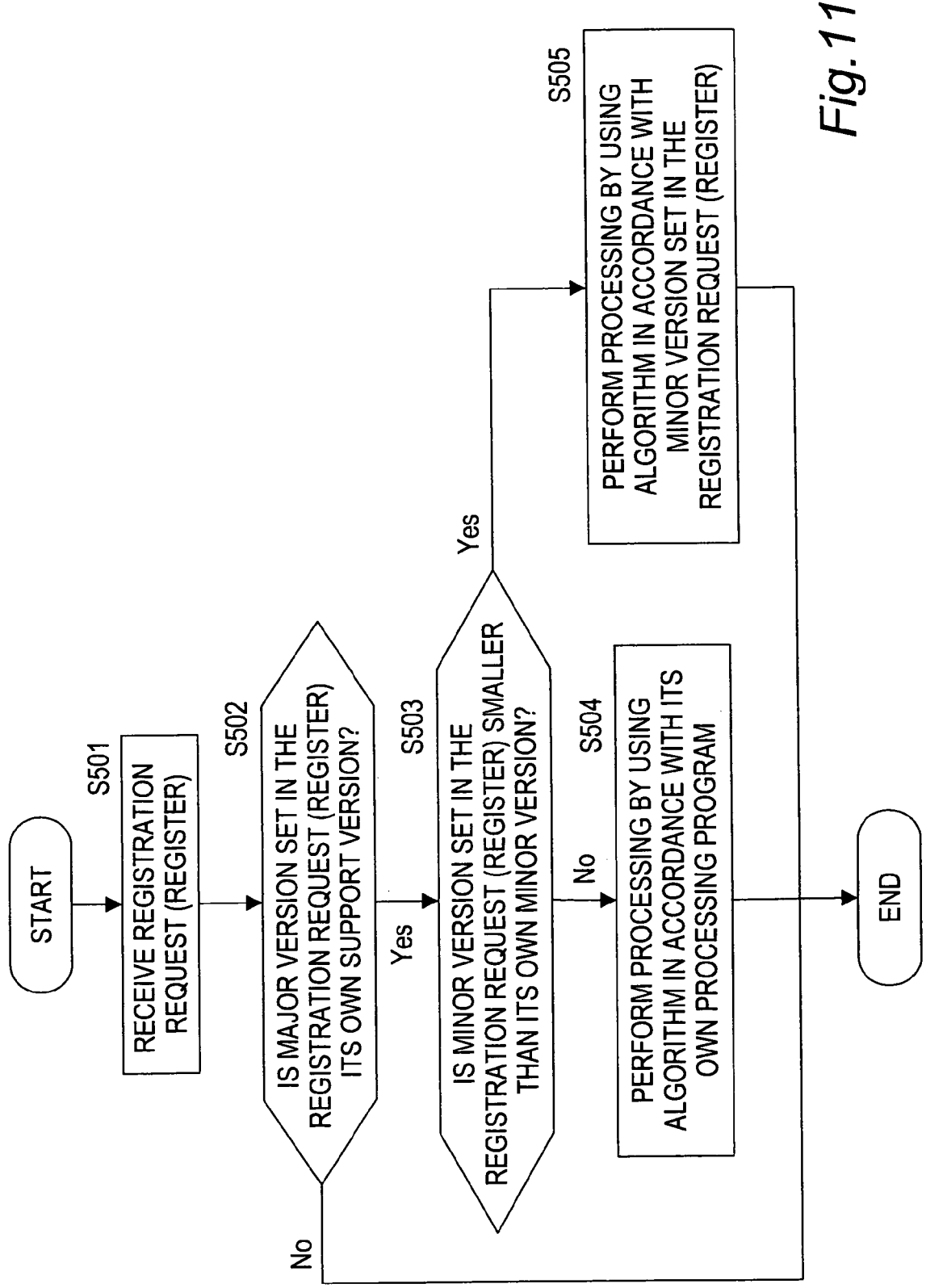
FIG. 11 is a flowchart illustrating a version adjustment process performed at a server in the client registration process.

FIG. 11 is a flowchart illustrating the processing sequence setting procedure based on the version notification from the client (controller) side at the server (device) side. In step S501, the server receives the MAC registration request from the client. This is the MAC address registration method described in the first embodiment and the second embodiment for the above-described client registration process example, and is broadcast data of, for example, every three seconds in a period of five minutes at the UDP layer.

The client stores the version information, for example, [1.0], [1.1], etc., of the program for executing the MAC registration process sequence to be performed by the client itself in the MAC registration request from the client, and transmits it to the server.

When the MAC registration request (Register) from the client is received in step S501, in step S502, the server makes a determination as to the processability on the basis of the comparison between the major version in the version information contained in the MAC registration request from the client and the major version of the version information of its self executable processing program.

As described above, since processing is possible in the case of the same major version, when the major version within the version information contained in the MAC registration request from the client matches the major version from the version information of the self executable processing program, the process proceeds to step S503. In the case of an unmatch, by determining that the processing is not possible, the processing is completed as is. In this case, the server may perform a process for notifying the fact that the processing is not possible to the client.

In step S503, the minor version within the version information contained in the MAC registration request from the client is compared with the minor version of the version information of the self executable processing program. If the minor version contained in the MAC registration request of the client is smaller than the minor version of the self executable processing program, the process proceeds to step S505, where the processing in the processing sequence in accordance with the version information contained in the MAC registration request from the client is performed.

On the other hand, if the minor version contained in the MAC registration request of the client is not smaller than the minor version of the self executable processing program, the process proceeds to step S504, where the processing in the processing sequence in accordance with the version of the processing program possessed by the server itself is performed.

Figure 12:
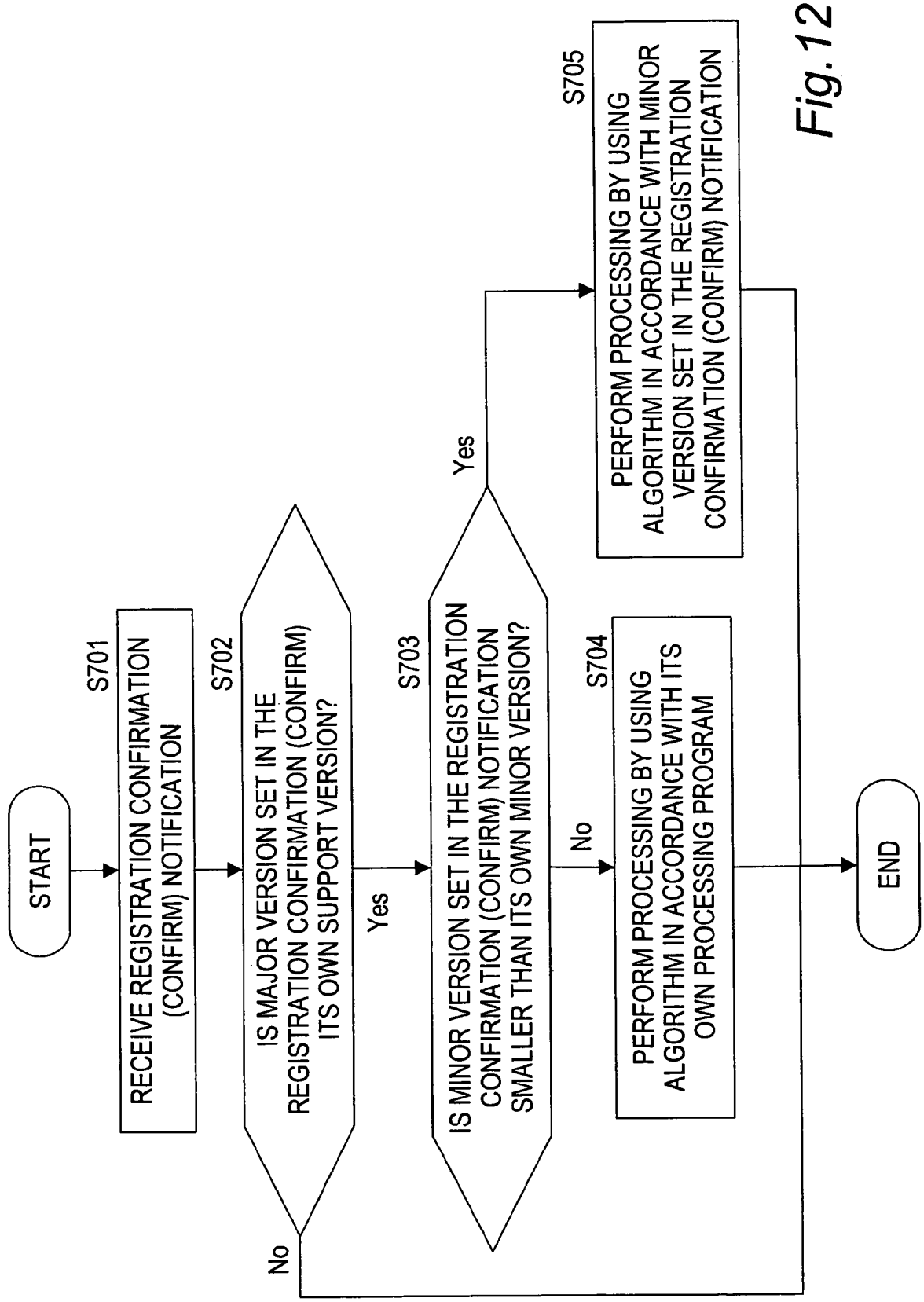
FIG. 12 is a flowchart illustrating a version adjustment process performed at a client in the client registration process.

A description will now be given, with reference to FIG. 12, of a procedure for setting, on the client (controller) side, the processing sequence on the basis of a version notification from the server (device) side. In step S701, the client receives a MAC registration confirmation request (Confirm) from the server. This is a response, from the server, for the MAC address registration method transmitted from the client, described in the first embodiment and the second embodiment of the above-described client registration process example, and is unicast data at the TCP layer.

The server stores, in the MAC registration confirmation to be transmitted from the server, the version information, for example, [1.0], [1.1], etc., of the execution program of the MAC registration process sequence performed by the server itself.

When the MAC registration confirmation is received from the server in step S701, in step S702, the client makes a determination as to the processability on the basis of the comparison between the major version within the version information contained in the MAC registration confirmation from the server and the major version of the version information of the self executable processing program.

Since the processing is possible in the case of the same major version, when the major version within the version information contained in the MAC registration confirmation from the server matches the major version of the version information of the self executable processing program, the process proceeds to step S703. In the case of an unmatch, by determining that the processing is not possible, the processing is completed as is. In this case, the client may perform a process for notifying the fact that the processing is not possible to the server.

In step S703, the minor version within the version information contained in the MAC registration confirmation from the server is compared with the minor version of the version information of the self executable processing program. If the minor version contained in the MAC registration confirmation of the server is smaller than the minor version of the self executable processing program, the process proceeds to step S705, where the processing in the processing sequence in accordance with the version information contained in the MAC registration confirmation from the server is performed.

On the other hand, if the minor version contained in the MAC registration confirmation of the server is not smaller than the minor version of the self executable processing program, the process proceeds to step S704, where a process in the processing sequence in accordance with the version of the self executable processing program is performed.

In this manner, in the configuration of the present invention, in the device registration process between the server and the client, the version information of the processing programs possessed by the two devices is notified, and by adjusting the processing sequence, the device registration process is performed. Therefore, also, among devices in which programs of various versions are stored, a device registration process in accordance with a unified processing sequence can be performed.

[Functional Configuration of Server and Client]

The hardware configuration of the server and the client device is as described above with reference to FIG. 2. The above-described various types of processes are performed by the CPU serving as the control section in accordance with the program stored in the storage section of each of the server and the client.

Examples of processes performed by the CPU on the server side include a process for inputting a request from the client, analyzing the input information, and performing a registration in a MAC list, that is, access control information based on the analysis result, a process for generating and analyzing packets to be transmitted to and received from the client, and a process for outputting various kinds of messages and analyzing user input information in the registration process. Examples of processes on the client side include a process for analyzing information received from the server, a process for generating and analyzing packets to be transmitted to and received from the server, and a process for outputting various kinds of messages and analyzing user input information in the registration process.

Figure 13:
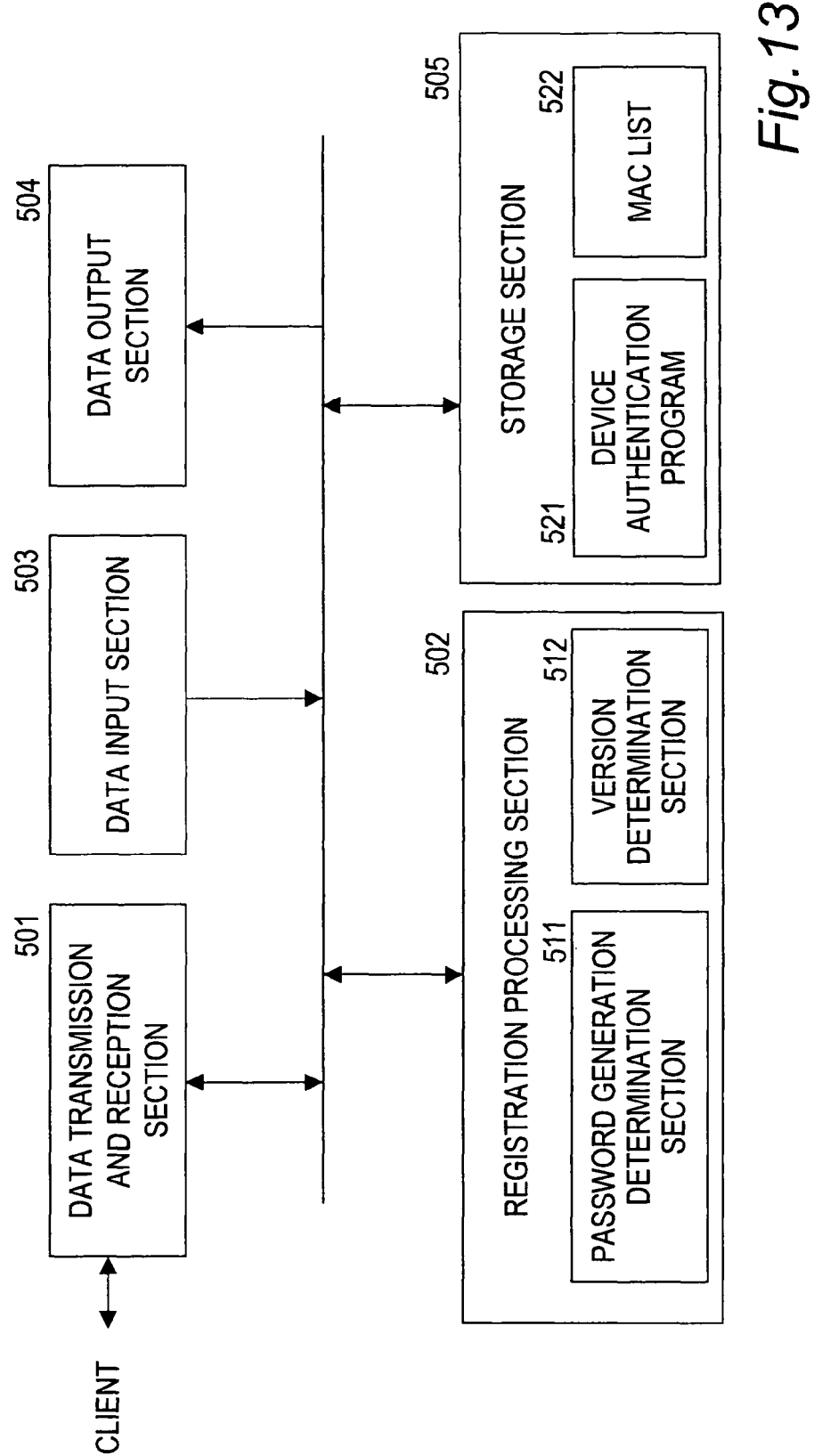
FIG. 13 is a block diagram showing the configuration of the server.
Figure 14:
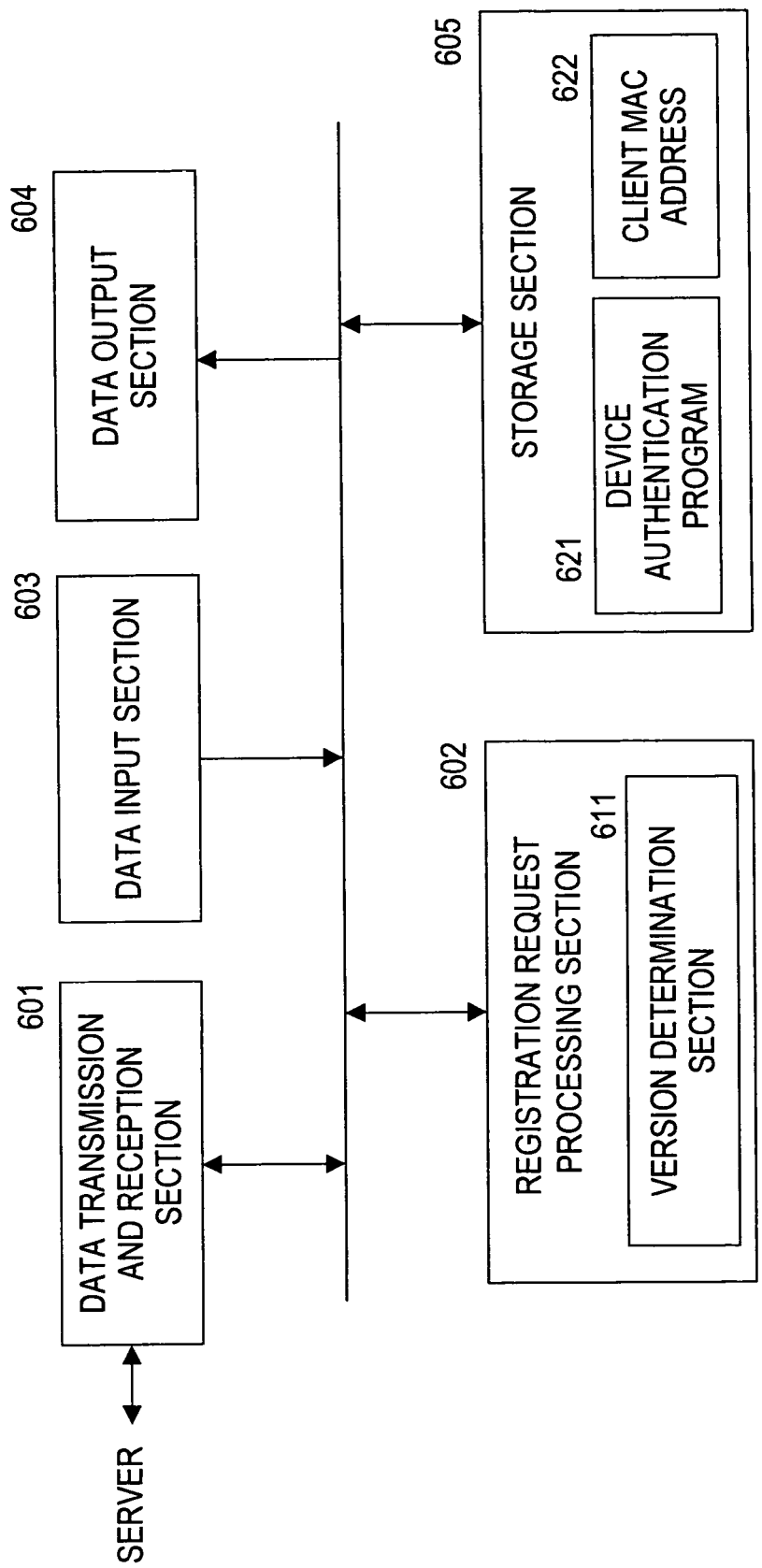
FIG. 14 is a block diagram showing the functional configuration of the client.

Basically, these processes are performed in accordance with the prestored processing program under the control of the CPU serving as the control section of the server and the client device. Processing performed by the CPU serving as the control section and the stored data of the storage section will now be described with reference to FIGS. 13 and 14. FIG. 13 is a block diagram illustrating the main functional configuration of the server, and FIG. 14 is a block diagram illustrating the main functional configuration of the client.

First, the functional configuration of the server will be described with reference to the block diagram of FIG. 13 showing the functional configuration of the server. The data transmission and reception section 501 receives packets for the client and packets from the client. The data transmission and reception section 501 performs a transmission packet generation process and a received packet analysis process. Examples of the process thereof include a process for setting the address of packets, recognizing the address, storing data in the data part, and obtaining data from the data part.

A registration process section 502 performs a series of processing sequences based on a registration request from the client. The registration process section 502 performs a process corresponding to each of the sequence diagrams and the flowcharts in accordance with a device authentication program 521 stored in the storage section 505. The registration process section 502 has a password generation determination section 511 for performing password generation and registration processes, and a version determination section 512 for determining the processing sequence by referring to the program version described with reference to the flowchart of FIG. 11.

A data input section 503 is an input section, such as a keyboard, for inputting a user signal to the registration process section 502. A data output section 504 is an output section, such as a display, for displaying message data, etc., based on a device signal output by the registration process section 502.

In the storage section 505, the device authentication program 521 for performing the registration process sequence is stored. In this processing program, version information composed of the major version and the minor version is added. In the storage section 505, furthermore, a MAC list 522 in which a client MAC address is stored as access control information of the client is stored.

A description will now be given, with reference to FIG. 14, of the functional configuration of the client device. The data transmission and reception section 501 receives packets for the client and packets from the client. The data transmission and reception section 601 performs a process for generating transmission packets and a process for analyzing received packets. Examples of the process thereof include a process for setting the address of packets, recognizing the address, storing data in the data part, and obtaining data from the data part.

A registration requesting process section 602 performs a series of processing sequences of the client registration requesting process with respect to the server. The registration requesting process section 602 performs a process corresponding to each of the above-described sequence diagrams and flowcharts in accordance with the device authentication program 621 stored in the storage section 605. The registration requesting process section 602 has a version determination section 611 for determining the processing sequence by referring to the program version described with reference to the flowchart of FIG. 12.

A data input section 603 is an input section, such as a keyboard, for inputting a user signal to the registration requesting process section 602. A data output section 604 is an output section, such as a display, for displaying message data, etc., based on the device signal output by the registration requesting process section 602.

In the storage section 605, the device authentication program 621 for performing the registration process sequence is stored. In this processing program, version information composed of the major version and the minor version is added. In the storage section 605, furthermore, a MAC address 622 of the client is stored.

Functionally speaking, the server and the client have functions shown in FIGS. 13 and 14, and perform the above-described processes. However, the block diagrams shown in FIGS. 13 and 14 are block diagrams for illustrating functions, and, in practice, various types of processing programs are performed under the control of the CPU in the hardware configuration, such as the PC shown in FIG. 2.

In the foregoing, the present invention has been described in detail while referring to the specific embodiments. However, it is self-explanatory that a person skilled in the art can modify or substitute the embodiments without departing from the spirit and the scope of the present invention. That is, the present invention has been disclosed in the form of examples, and should not be construed as being limited thereto. In order to determine the gist of the present invention, the claim section described at the beginning should be taken into consideration.

A series of processes described in the specification can be performed by hardware, software, or a combined configuration of them. In a case where the series of processes is performed by software, a program in which a processing sequence is recorded can be installed into a memory in a computer incorporated into dedicated hardware, whereby the program is executed, or can be installed into a general-purpose computer capable of executing various types of processes, whereby the program is executed.

For example, the program can be recorded in advance in a hard disk or a ROM (Read Only Memory) as a recording medium. Alternatively, the program can be temporarily or permanently stored (recorded) in a removable recording medium such as a flexible disk, a CD-ROM (Compact Disc Read Only Memory), an MO (Magneto-optical) disk, a DVD (Digital Versatile Disc), a magnetic disk, or a semiconductor memory. Such a removable recording medium can be provided as commonly called packaged software.

In addition to being installed into a computer from the above-described removable recording medium, programs can be transferred wirelessly from a download site to a computer or can be transferred by wire to a computer via a network, such as a LAN (Local Area Network) or the Internet, and in the computer, the programs which are transferred in such a manner can be received and installed into a recording medium such as the hard disk contained therein.

Various processes described in the specification may be executed chronologically according to the description, and also, they may be executed concurrently or individually according to the processing performance of the device which performs a process or according to the necessity. The system in this specification represents a logical assembly of a plurality of devices, and is not limited to a configuration in which each device is disposed in the same housing.

INDUSTRIAL APPLICABILITY

As has thus been described, according to the present invention, only the MAC address of the client authorized by user operation is authenticated and registered in the server, and the server permits only the access to the client having the authenticated and registered MAC address. As a result, even if a router for separating from the other users within the same subnet is not disposed, while access from an unauthorized party which is not authenticated and registered is avoided, the presence of the server is not known to the client (controller 351) side which attempts to illegally perform device authentication.

According to the configuration of the present invention, when a plurality of conflicting registration requests having a different MAC address are received, these conflicting MAC addresses are not temporarily stored, and by ignoring the registration request from the client (controller 351) side having a conflicting MAC address, the device authentication is stopped. Therefore, unauthorized access can be prevented, and also, the presence of the server itself can be made not known to the client (controller 351) side which attempts to illegally perform device authentication.

According to the present invention, only when the passwords are verified and these match, only the MAC address of the authorized client is authenticated and registered in the server side, and the server permits only the access to the client having the authenticated and registered MAC address. As a result, even if a router for separating from the other users within the same subnet is not disposed, it is possible to provide access control with high security such that, while access from an unauthorized party which is not authenticated and registered is avoided, the presence of the server is not known to the client (controller 351) side which attempts to illegally perform device authentication.

According to the configuration of the present invention, when the verification between the input password and the password which is set in advance in the server itself does not continuously match a predetermined number of times, the device authentication is stopped by deleting the MAC address which is temporarily stored. Therefore, unauthorized access by the misrepresentation of a password can be prevented.

According to the configuration of the present invention, as the final step of the MAC registration process, the registration completion (Complete) confirmation process is performed, and a MAC registration completion confirmation is transmitted from the server (device) side to the client (controller) side. As a result, it becomes possible for the user to confirm the final registration completion on the basis of the registration completion message at the two devices. Furthermore, on the client (controller) side, if a process for transmitting M-search of the SSDP (simple service detection protocol) as a service searching process is performed under the condition that a MAC registration completion confirmation notification is received from the server (device) side, it is guaranteed that the MAC registration has been completed on the server (device) side. Therefore, it becomes possible to reliably receive the response for the service searching process.

As a result of performing a registration completion (Complete) confirmation process as the final step of the MAC registration process, an M-search transmission process can be automatically performed under the condition that the MAC registration completion confirmation notification is received from the server (device) side, and it becomes possible for the client to receive service information from the server following the registration process with respect to the server without the intervention of a user's input process, etc.

Furthermore, according to the configuration of the present invention, when a MAC registration request from the client which has already been registered in the MAC list of the server is made, a confirmation notification process for informing that the registration has already been completed is performed among the devices is performed. Therefore, a message display for informing that the registration has been completed becomes possible on the basis of these notifications, and thus the user can confirm the fact that the client device has already been registered in the server.

Furthermore, according to the configuration of the present invention, in the device registration process between the server and the client, the version information of the processing programs possessed by the two devices is notified, and by adjusting the processing sequence, the device registration process is performed. Therefore, a device registration process in accordance with a unified processing sequence can be performed even among devices in which programs of various versions are stored.

The invention claimed is:

1. A device authentication system comprising:
a first device provided on the client side of a client/server system; and
a second device provided on the server side of the client/server system,
wherein said first device comprises
a registration requesting unit configured to iteratively, at a predetermine time interval, send a request for registering a MAC address specific to the first device in response to a registration requesting operation of a user;

said second device comprises
- a temporary memory configured to temporarily store the MAC address, when a registration request having the same MAC address is received a plurality of times or for one time within a predetermined time after a first confirmation operation of the user is performed;
- a registration confirmation unit configured to send a registration confirmation to the first device having the MAC address stored in said temporary memory in response to a second confirmation operation of the user;

said first device further comprises
- a registration confirmation responding unit configured to receive said registration confirmation so as to instruct said registration requesting unit to stop the iterative sending, and also to send back a registration confirmation response to the second device which has sent the registration confirmation;

said second device further comprises
- an authentication and registration unit configured to authenticate and register the MAC address which is temporarily stored in said temporary memory in response to a third confirmation operation of the user, which is performed after said registration confirmation response is received, and
- said second device rejects access from a client corresponding to the first device having a MAC address other than the MAC address which is authenticated and registered in the second device itself, and instructs the server not to respond at all to the client.

2. A device authentication system according to claim 1, wherein, when said second device receives a plurality of conflicting registration requests having different MAC addresses, said second device does not temporarily store those conflicting MAC addresses and stops the device authentication by ignoring the registration request from the first device having a conflicting MAC address.

3. A device authentication method comprising:
- a first process performed on the client side of a client/server system; and
- a second process performed on the server side of the client/server system, wherein said first process comprises
- a registration requesting step of iteratively, at a predetermined time interval, sending, on a network, a request for registering a MAC address specific to the client in response to a registration requesting operation of a user;

said second process comprises
- a temporary storing step of temporarily storing the MAC address, when a registration request having the same MAC address is received a plurality of times within a predetermined time after a first confirmation operation of the user is performed;
- a registration confirmation step of sending to the client side a registration confirmation performed at the client having the MAC address stored in said temporary storing step in response to a second confirmation operation of the user;

said first process further comprises
- a registration confirmation responding step of receiving said registration confirmation so as to instruct said registration requesting step to stop the iterative sending, and also for sending back a registration confirmation response to the server which has sent the registration confirmation;

said second process further comprises
- an authentication and registration step of authenticating and registering the MAC address which is temporarily stored in said temporary storing step in response to a third confirmation operation of the user, which is performed after said registration confirmation response is received, and said second process rejects access from a client having a MAC address other than the MAC address which is authenticated and registered in the server itself, and instructs the server not to respond at all to the client.

4. A device authentication method according to claim 3, wherein said second process does not temporarily store conflicting MAC addresses when a plurality of conflicting registration requests having a different MAC address are received, and stops device authentication by ignoring the registration request from the first process performed on the client side having a conflicting MAC address.

5. A recording medium in which a computer-readable program configured to make a computer perform a device authentication method is recorded, said device authentication method comprising:
- a first process executed on the client side of a client/server system; and
- a second process executed on the server side of the client/server system, wherein said first process comprises a registration requesting step of iteratively, at a predetermined time interval, sending, on a network, a request for registering a MAC address specific to the client in response to a registration requesting operation of a user;

said second process comprises
- a temporary storing step of temporarily storing the MAC address, when a registration request having the same MAC address is received a plurality of times within a predetermined time after a first confirmation operation of the user is performed;
- a registration confirmation step of sending a registration confirmation to the first process executed at the client having the MAC address stored in said temporary storing step in response to a second confirmation operation of the user;

said first process comprises
- a registration confirmation responding step of receiving said registration confirmation so as to instruct said registration requesting step to stop the iterative sending, and also for sending back a registration confirmation response to the second process which has sent the registration confirmation;

said second process further comprises
- an authentication and registration step of authenticating and registering the MAC address which is temporarily stored in said temporary storing step in response to a third confirmation operation of the user, which is performed after said registration confirmation response is received, and said second program rejects access from a client having a MAC address other than the MAC address which is authenticated and registered in the server itself, and instructs the server not to respond at all to the client.

6. A recording medium according to claim 5 in which a computer-readable program configured to make a computer perform a device authentication method is recorded, wherein, when a plurality of conflicting registration requests having a different MAC address are received, said second method does not temporarily store those conflicting MAC addresses, and stops the device authentication by ignoring the registration request from the first process executed on the client side having the conflicting MAC address.

* * * * *